(12) United States Patent
Sugano et al.

(10) Patent No.: US 6,466,247 B1
(45) Date of Patent: Oct. 15, 2002

(54) TIMING CONTROL OF LIGHT BEAM SCAN

(75) Inventors: Takao Sugano; Shunji Kitagawa, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/614,255

(22) Filed: Jul. 12, 2000

Related U.S. Application Data

(63) Continuation-in-part of application No. 09/511,499, filed on Feb. 23, 2000, now abandoned.

(30) Foreign Application Priority Data

May 31, 1999 (JP) ............................................ 11-152940

(51) Int. Cl.[7] .............................. B41J 2/435; B41J 2/47
(52) U.S. Cl. ...................................... 347/250; 347/235
(58) Field of Search ................................. 347/229, 234, 347/235, 236, 237, 248, 250, 253; 358/296, 409, 410; 250/234

(56) References Cited

U.S. PATENT DOCUMENTS

| | | | | |
|---|---|---|---|---|
| 5,264,871 A | * | 11/1993 | Tsukada | 347/253 |
| 5,291,222 A | * | 3/1994 | Ohashi | 347/248 |
| 5,477,330 A | * | 12/1995 | Dorr | 358/296 |
| 5,724,087 A | | 3/1998 | Sugano et al. | 347/248 |
| 5,764,270 A | | 6/1998 | Kitagawa et al. | 347/234 |
| 6,005,243 A | * | 12/1999 | Yamazaki | 250/234 |

FOREIGN PATENT DOCUMENTS

| | | |
|---|---|---|
| JP | 62-174718 | 7/1987 |
| JP | 63-254857 | 10/1988 |
| JP | 1-209871 | 8/1989 |
| JP | 3-271711 | 12/1991 |
| JP | 5-136950 | 6/1993 |
| JP | 7-253553 | 10/1995 |
| JP | 8-118725 | 5/1996 |
| JP | 9-76559 | 3/1997 |

* cited by examiner

*Primary Examiner*—Hai Pham
(74) *Attorney, Agent, or Firm*—Armstrong, Westerman & Hattori, LLP

(57) ABSTRACT

A circuit for controlling scanning of light includes a detection-signal processing unit which generates a detection signal indicative of a timing at which a light beam hits a predetermined reference position, and a clock-generation unit which generates a clock signal in synchronism with the detection signal such that a timing of the clock signal is adjustable by the detection signal independently of a length of one clock cycle of the clock signal, wherein the clock signal synchronizes the light beam.

9 Claims, 19 Drawing Sheets

TIMING CONTROL OF LIGHT BEAM SCAN

This application is a Continuation-in-part of prior application Ser. No. 09/511,499 filed Feb. 23, 2000, which is now abandoned.

BACKGROUND OF THE INVENTION

1. Field of the Invention

The present invention generally relates to a circuit for controlling scanning of light beams, an optical unit, and an image forming device. The present invention particularly relates to a circuit for controlling scanning of light beams so as to achieve desired scanning of a plurality of light beams, and further relates to an optical unit and an image forming device based on such a control circuit.

2. Description of the Related Art

Laser beam printers are required to be faster and to be better in terms of image resolution. To meet such requirements, scanning of a laser beam needs to be faster, which is achieved by rotating a polygon mirror of an optical unit at a faster rate. A rotation rate of a polygon mirror is around 30,000 rpm in a currently available optical unit, and this rate is close to an upper limit when physical and mechanical constraints are taken into account. Against this background, a multi-beam optical unit has been developed in order to scan a plurality of laser beams.

The multi-beam optical unit scans a plurality of laser beams on a photosensitive drum while slightly displacing each laser beam from the others, thereby create a latent image on the photosensitive drum. If relative positional relations between the laser beams are not correct, it results in a poor image quality. Relation of scan positions between laser beams thus needs to be controlled with accuracy.

FIG. 1 is a block diagram of a related-art laser printer.

The laser printer 1 includes a printer-sheet conveyor mechanism 2, a photosensitive drum 3, a charging device 4, an optical unit 5, a developing unit 6, a transfer unit 7, a fixing unit 8, and a video controller 9.

A printer sheet 10 is carried by the printer-sheet conveyor mechanism 2 in a direction shown by an arrow A. The printer sheet 10 first comes in contact with the photosensitive drum 3, which rotates in a direction shown by an arrow B. The photosensitive drum 3 is electrically charged by the charging device 4, and, rotates in the direction B. The optical unit 5 directs laser beams L1 and L2 onto the photosensitive drum 3 so as to create a latent image on a surface thereof.

The photosensitive drum 3 having the latent image created thereon is further rotated in the direction B, and has a toner image developed thereon by the developing unit 6. The transfer unit 7 then transfers the toner image from the photosensitive drum 3 to the printer sheet 10.

The printer-sheet conveyor mechanism 2 further carries the printer sheet 10 in the direction A, so that the printer sheet 10 is supplied to the fixing unit 8. The fixing unit 8 fixes the transferred toner image permanently on the printer sheet 10 by applying heat, for example. The printer sheet 10 having the toner image fixed thereon is further carried in the direction A by the printer-sheet conveyor mechanism 2 until it is ejected.

In the following, a description of the optical unit 5 will be given.

The optical unit 5 includes laser diodes D1 and D2, a polygon mirror 11, a motor 12, a motor driver 13, mirrors 14 and 15, a laser-beam-reference-position detecting unit 16, laser-power-adjustment beam-detection units 17 and 18, an optical control unit 19, a mechanism control unit 20, a power unit 21, and switches SW1 through SW4.

The laser diodes D1 and D2 are connected to the optical control unit 19, and generate laser beams L1 and L2, respectively. The laser beams L1 and L2 hit the polygon mirror 11.

The polygon mirror 11 is rotated by the motor 12 in a direction shown by an arrow C at a constant rotation rate. The motor driver 13 controls the motor 12 to rotate at a constant rate such as 3,000 rpm. The laser beams L1 and L2 are reflected by the rotating polygon mirror 11 so that they are scanned in the direction C.

The polygon mirror 11 directs the laser beams L1 and L2 to the mirror 15 first. The mirror 15 reflects the laser beams L1 and L2 coming from the polygon mirror 11 so as to direct them to the laser-beam-reference-position detecting unit 16. After the laser beams L1 and L2 illuminate the laser-beam-reference-position detecting unit 16, the polygon mirror 11 further rotates in the direction C (i.e., the direction shown by the arrow C). The laser beams L1 and L2 are scanned in a direction indicated by an arrow D, and hit the mirror 14. The mirror 14 reflects the laser beams L1 and L2, and directs them to the photosensitive drum 3.

As the polygon mirror 11 rotates in the direction C, the laser beams L1 and L2 are scanned in the direction D, so that they move on the mirror 14 in a direction indicated by an arrow E. As the laser beams L1 and L2 sweep in the direction E on the mirror 14, their reflections are scanned in a direction shown by an arrow F on the photosensitive drum 3. As the scanning of the laser beams L1 and L2 on the photosensitive drum 3 progresses, the laser beams L1 and L2 are controlled to be turned on or off appropriately.

The laser-beam-reference-position detecting unit 16, which detects the laser beams L1 and L2 as previously described, supplies a detection signal to the optical control unit 19.

The optical control unit 19 detects positions of the laser beams L1 and L2 on the photosensitive drum 3 based on the detection signal supplied from the laser-beam-reference-position detecting unit 16.

The laser beams L1 and L2 are also supplied to the laser-power-adjustment beam-detection units 17 and 18, respectively. The laser-power-adjustment beam-detection units 17 and 18 supply detection signals indicative of intensities of the laser beams L1 and L2, respectively, to the optical control unit 19. The optical control unit 19 monitors the intensities of the laser beams L1 and L2, and attends to power control so as to achieve constant beam intensity.

The optical control unit 19 includes laser control circuits 22 and 23 and an optical control circuit 24. The laser control circuits 22 and 23 control the laser diodes D1 and D2, respectively, based on the detection signals supplied from the laser-power-adjustment beam-detection units 17 and 18, respectively.

The optical control circuit 24 receives a video signal from the video controller 9 where the video signal represents an image to be reproduced on a sheet. Further, the optical control circuit 24 receives the detection signal from the laser-beam-reference-position detecting unit 16. In response to the detection signal from the laser-beam-reference-position detecting unit 16, the optical control circuit 24 controls an on/off state of the laser beams L1 and L2 in accordance with the video signal supplied from the video controller 9.

The mechanism control unit 20 attends to control of various mechanisms such as drive control of the printer-sheet conveyor mechanism 2 and rotation control of the photosensitive drum 3. Further, the mechanism control unit 20 includes relays R1 through 5, which are switched according to the switches SW1 through SW4 that detect an open/close status of a stack cover, a front cover, and an eject cover as well as a presence/absence of a transport unit. In the mechanism control unit 20, the relays R1 through R5 are turned on if the stack cover, the front cover, and the eject cover are all closed, and if the transport unit is present. As the relays R1 through R5 are turned on, power is supplied from the power unit 21 to the optical control unit 19.

In the following, the optical control circuit 24 will be described in connection with timing control of the laser beams L1 and L2.

FIG. 2 is an illustrative drawing for explaining a displacement between the laser beams L1 and L2 in their scan direction shown by an arrow F. FIG. 3 is an illustrative drawing for explaining a displacement between the laser beams L1 and L2 in their sub-scan direction shown by an arrow B. FIGS. 4A and 4B are illustrative drawings showing a positional relation between the laser beams L1 and L2.

As shown in FIG. 2, the laser beam L1 is scanned ahead of the laser beam L2 in a main scan direction shown by the arrow F. As shown in FIG. 3, also, the laser beams L1 and L2 are displaced from each other in the sub-scan direction B by one scan line, and are positioned separately on adjacent scan lines.

Namely, the laser beams L1 and L2 have a gap L therebetween in the main scan direction F, and are separated from each other by one line in the sub-scan direction B as shown in FIG. 4A. With this relative positioning being maintained, the laser beams L1 and L2 are scanned on the photosensitive drum 3.

It should be noted that when dots are to be generated in a line along the direction B as shown in FIG. 4B, a time T from a synchronization point BD to a position P0 needs to be accurately controlled.

In the following, a circuit for controlling timings of the laser beams L1 and L2 will be described.

FIG. 5 is a block diagram of the related-art optical control circuit.

The optical control circuit 24 includes a video-data splitting circuit 25, parallel-to-serial-conversion circuits 26 and 27, a detection-signal processing circuit 28, an oscillator circuit 29, synchronization circuits 30 and 31, delay units 32 and 33, and 1/N frequency dividing units 34 and 35.

The video-data splitting circuit 25 receives the video data from the video controller 9, and distributes video lines alternately to the parallel-to-serial-conversion circuit 26 or to the parallel-to-serial-conversion circuit 27.

The parallel-to-serial-conversion circuit 26 attends to parallel-to-serial conversion of the video data supplied from the video-data splitting circuit 25 in synchronism with a clock signal supplied from the 1/N frequency dividing unit 34. Serial data output from the parallel-to-serial-conversion circuit 26 is supplied to the laser control circuit 22. Based on the supplied serial data, the laser control circuit 22 controls the laser diode D1.

The parallel-to-serial-conversion circuit 27 attends to parallel-to-serial conversion of the video data supplied from the video-data splitting circuit 25 in synchronism with a clock signal supplied from the 1/N frequency dividing unit 35. Serial data output from the parallel-to-serial-conversion circuit 27 is supplied to the laser control circuit 23. Based on the supplied serial data, the laser control circuit 23 controls the laser diode D2.

The laser beams L1 and L2 output from the laser diodes D1 and D2 hit the polygon mirror 11. The polygon mirror 11 reflects the laser beams L1 and L2, and directs them to the laser-beam-reference-position detecting unit 16. Thereafter, the laser beams L1 and L2 are scanned over the photosensitive drum 3.

The detection signal from the laser-beam-reference-position detecting unit 16 is supplied to the detection-signal processing circuit 28. Based on the supplied detection signal, the detection-signal processing circuit 28 controls the video-data distribution timing of the video-data splitting circuit 25. 28 supplies detection pulses to the synchronization circuits 30 and 31 in response to the detection signal from the laser-beam-reference-position detecting unit 16.

Each of the synchronization circuits 30 and 31 receives a clock signal from the oscillator circuit 29 where the clock signal has a frequency N times as high as that of a video clock. In response to the detection pulse from the detection-signal processing circuit 28, each of the synchronization circuits 30 and 31 outputs the clock signal supplied from the oscillator circuit 29.

The clock signals output from the synchronization circuits 30 and 31 are supplied to the delay units 32 and 33, respectively. The delay units 32 and 33 delay the supplied clock signals by a predetermined delay time, and supply the delayed clock signals to the 1/N frequency dividing units 34 and 35, respectively.

The delay time introduced by the delay units 32 and 33 should be equal to a time difference between when the laser-beam-reference-position detecting unit 16 detects a laser beam and when the laser beam reaches a position where the video data should be printed. Namely, the delay time should be equivalent to the time T shown in FIG. 4B. The 1/N frequency dividing units 34 and 35 divide by N the frequency of the clock signal supplied from the delay units 32 and 33, respectively, thereby generating clock signals having the same cycle as the video-data clock. The generated clock signals are supplied to the parallel-to-serial-conversion circuits 26 and 27.

In response to the respective clock signals supplied from the 1/N frequency dividing units 34 and 35, the parallel-to-serial-conversion circuits 26 and 27 convert parallel video data to serial data when the parallel video data is supplied form the video-data splittin to the laser control circuits 22 and 23.

In the related-art configuration described above, a timing of a laser-beam scan is marked by a detection signal that is generated by detecting a laser beam at a reference position. In response to this detection signal, a clock signal with a frequency thereof N times as high as the frequency of video data is extracted, and its frequency is divided by N to generate a video clock. In this configuration, a timing of the video data is adjustable only by a minimum shift equal to one clock cycle of the clock signal that has N times the frequency of the video clock.

If the frequency of the clock signal is increased with an aim of achieving finer adjustment of clock timings, electrical-circuit components need to be changed to those adapted for use in high frequencies, and a measure has to be taken against electromagnetic fields. Such needs result in more expensive devices.

Accordingly, there is a need for a circuit for controlling scanning of light beams which can achieve finer timing adjustment of scanning of light beams, and, also, there is a need for an optical unit and an image forming device employing such a control circuit.

SUMMARY OF THE INVENTION

Accordingly, it is a general object of the present invention to provide a scheme for controlling scanning of light beams which can satisfy the need described above.

It is another and more specific object of the present invention to provide a circuit for controlling scanning of light beams which can achieve finer timing adjustment of scanning of light beams.

In order to achieve the above objects according to the present invention, a circuit for controlling scanning of light includes a detection-signal processing unit which generates a detection signal indicative of a timing at which a light beam hits a predetermined reference position, and a clock-generation unit which generates a clock signal in synchronism with the detection signal such that a timing of the clock signal is adjustable by the detection signal independently of a length of one clock cycle of the clock signal, wherein the clock signal synchronizes the light beam.

In the control circuit described above, the clock-generation unit such as a clock generator generates the clock signal in synchronism with the detection signal. The timing of the clock signal is thus free from an undesirable displacement that is found in the related-art configuration in which the adjustment of the clock signal is dependent upon the length of the clock cycle of the clock signal.

It is yet another object of the present invention to provide an optical unit and an image forming device employing such a control circuit.

The object described above is achieved by an optical unit or an image forming device including a light-beam generating unit which generates a light beam, a light-beam scanning unit which scans the light beam, a detection-signal processing unit which generates a detection signal indicative of a timing at which the light beam hits a predetermined reference position, and a clock-generation unit which generates a clock signal in synchronism with the detection signal such that a timing of the clock signal is adjustable by the detection signal independently of a length of one clock cycle of the clock signal, wherein the clock signal synchronizes the light beam.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 6:
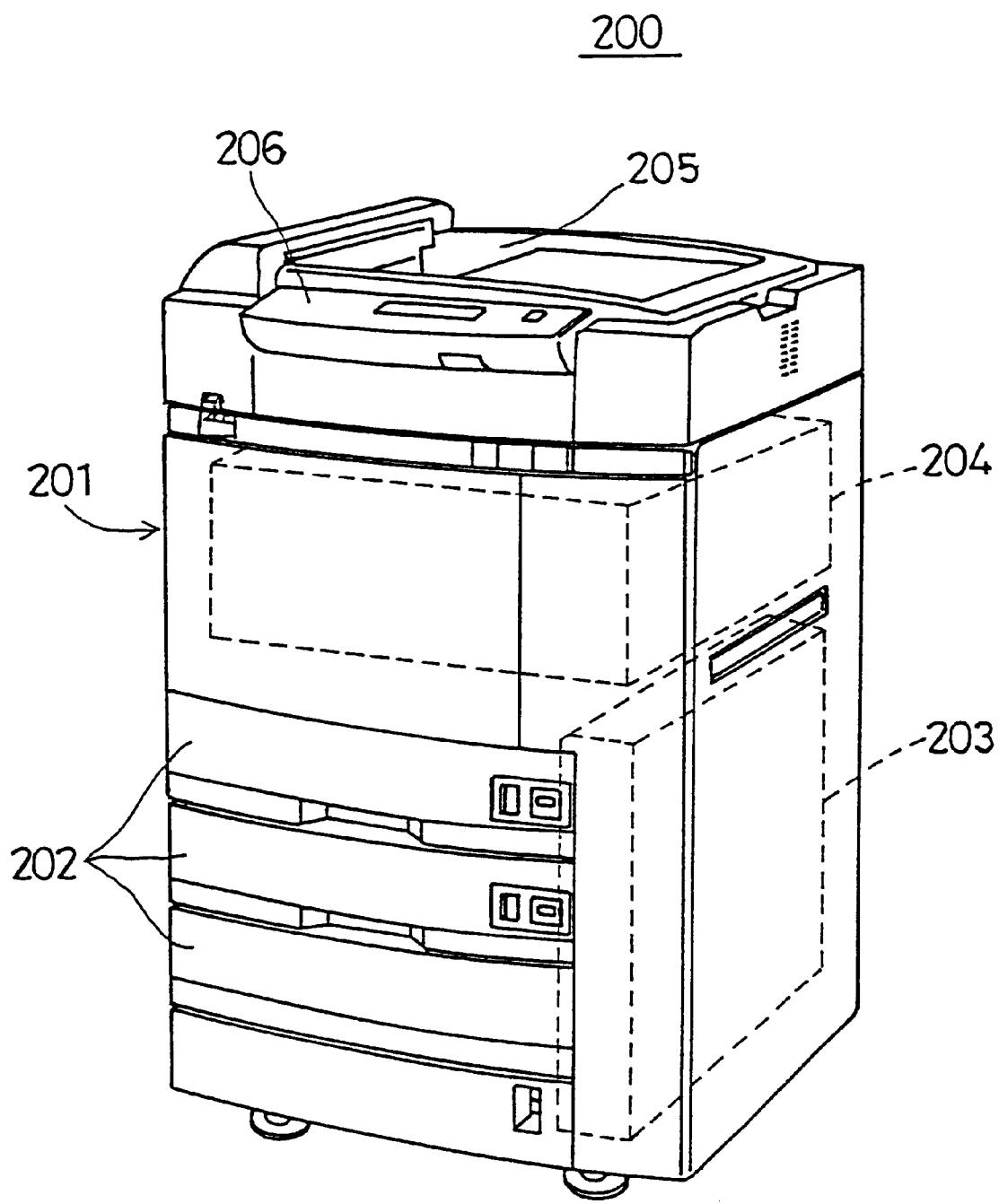
FIG. 6 is an illustrative drawing showing a general appearance of an image forming device according to an embodiment of the present invention.

FIG. 6 is an illustrative drawing showing a general appearance of a laser printer according to an embodiment of the present invention.

A laser printer 200 of this embodiment includes a printer housing 201, a printer-sheet cassette 202, a conveyor unit 203, an image forming unit 204, a stacker 205, and an operation panel 206. The printer-sheet cassette 202, the conveyor unit 203, the image forming unit 204, the stacker 205, and the operation panel 206 are all contained in or supported by the printer housing 201 so as to provide an appearance of a single integrated device.

The printer-sheet cassette 202 contains printer sheets. The printer-sheet cassette 202 may include a plurality of cassette cases for different paper sizes, and these cassette cases may be stored in a rack-style storage. Printer sheets are supplied from the printer-sheet cassette 202 to the image forming unit 204 by the conveyor unit 203.

The image forming unit 204 forms an image on a printer sheet supplied from the printer-sheet cassette 202. The printer sheet having an image formed thereon by the image forming unit 204 is ejected to the stacker 205.

Figure 7:
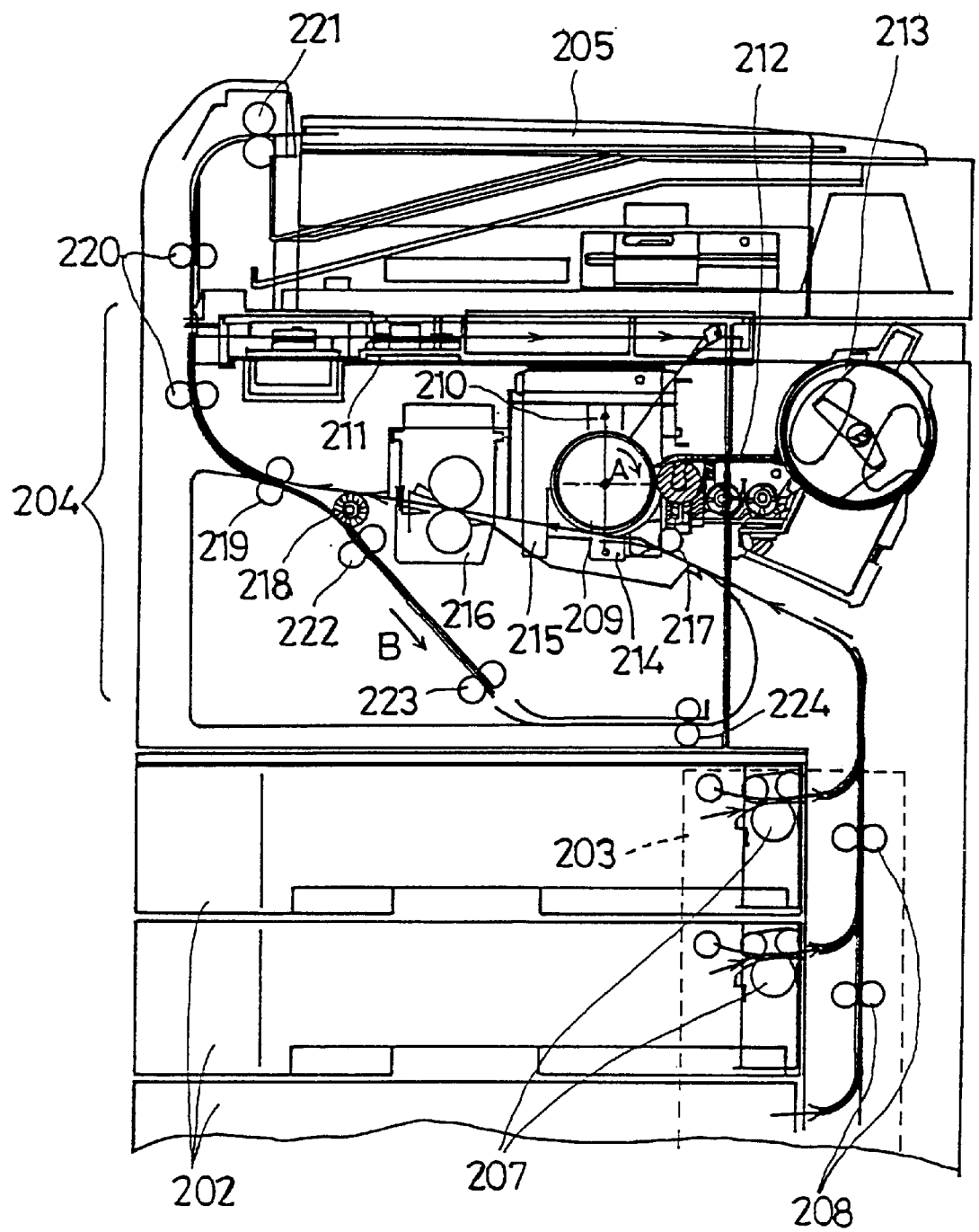
FIG. 7 is an illustrative drawing showing a configuration of the image forming device according to the embodiment of the present invention.

FIG. 7 is an illustrative drawing showing a configuration of the image forming device according to the embodiment of the present invention. In FIG. 7, the same elements as those of FIG. 6 are referred to by the same numerals, and a description thereof will be omitted.

The conveyor unit 203 includes pick-up rollers 207 and conveyor rollers 208. The pick-up rollers 207 comes in contact with a printer sheet, and picks up the printer sheet from the printer-sheet cassette 202.

The printer sheet picked up by the pick-up rollers 207 is supplied to the image forming unit 204 by the conveyor rollers 208.

The image forming unit 204 includes a photosensitive drum 209, a charging unit 210, an optical unit 211, a developing unit 212, a cartridge 213, a transfer unit 214, a cleaner 215, a fixing unit 216, and conveyor rollers 217 through 223. The photosensitive drum 209 is rotatable in a direction shown by an arrow A. A given surface area of the photosensitive drum 209 is electrically charged by the charging unit 210 when the surface area comes to face the charging unit 210.

As the photosensitive drum 209 rotates, the charged surface area moves to the direction A (i.e., the direction indicated by the arrow A), and is illuminated by laser light. The laser light emitted by the optical unit 211 generates a latent image on the photosensitive drum 209. As the photosensitive drum 209 rotates further, the surface area having the latent image thereon comes to a position where it faces the developing unit 212.

The developing unit 212 receives toner from the cartridge 213. Using the toner, the developing unit 212 develops the latent image recorded on the photosensitive drum 209.

As the photosensitive drum 209 rotates further, the surface area having the toner image thereon moves in the direction A, and comes to face the transfer unit 214. At a position where the transfer unit 214 is situated, a printer sheet conveyed by the conveyor roller 217 comes in contact with the photosensitive drum 209. The transfer unit 214 transfers the toner image from the photosensitive drum 209 to the printer sheet.

The photosensitive drum 209 rotates further in the direction A after the toner image is transferred to the printer sheet, so that the surface area having residual of the toner image faces the cleaner 215. The cleaner 215 removes the remaining toner from the surface of the photosensitive drum 209. After this, the photosensitive drum 209 further rotates in the direction A so as to repeat electrical charging of the surface by the charging unit 210.

As described in the above, the printer sheet is carried by the conveyor roller 217 to come to a place between the photosensitive drum 209 and the transfer unit 214. The printer sheet receives the toner image transferred from the photosensitive drum 209. The printer sheet having the toner image thereon is then supplied to the fixing unit 216.

The fixing unit 216 applies heat to the printer sheet so as to fix the toner image on the printer sheet. The printer sheet having the toner image fixed thereon is conveyed by the conveyor rollers 218, 219, 220, and 221 so as to be ejected to the stacker 205. When there is a need to print on both surfaces of a sheet, the conveyor rollers 218 and 219 are reversed after a rear end of the printer sheet reaches the conveyor roller 218. This reversed motion carries the printer sheet in a direction indicated by an arrow B. The printer sheet is further carried by the conveyor rollers 218, 219, 222, 223, and 224 in the direction B (i.e., the direction indicated by the arrow B) until it reaches the conveyor roller 217. The printer sheet is flipped over when it reaches the conveyor roller 217. A toner image is then transferred on to the second surface of the printer sheet, thereby completing two-sided printing.

In the following, a description will be given with regard to the image forming unit 204.

Figure 8:
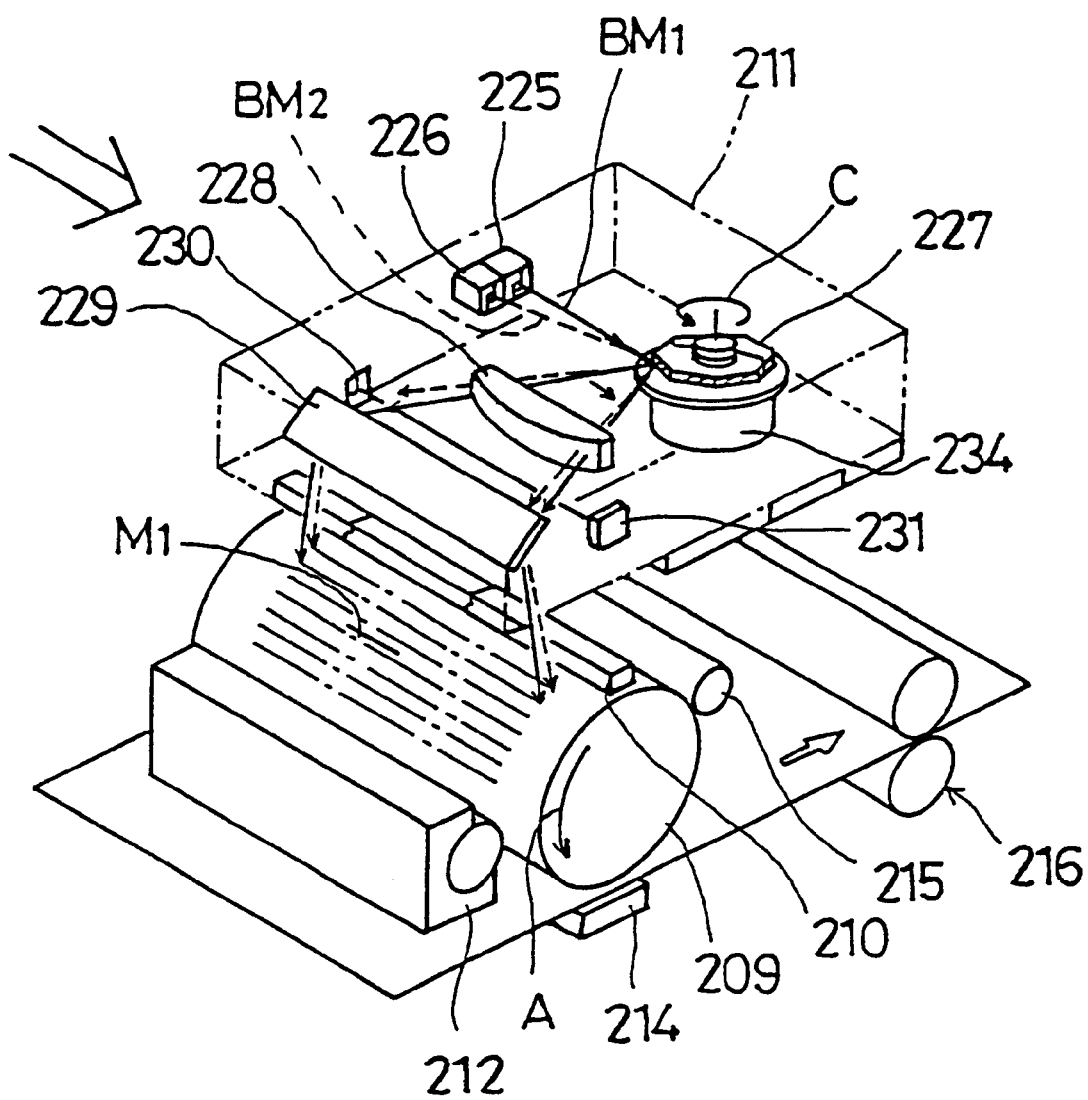
FIG. 8 is an illustrative drawing showing a configuration of an image forming unit according to the embodiment of the present invention.
Figure 9:
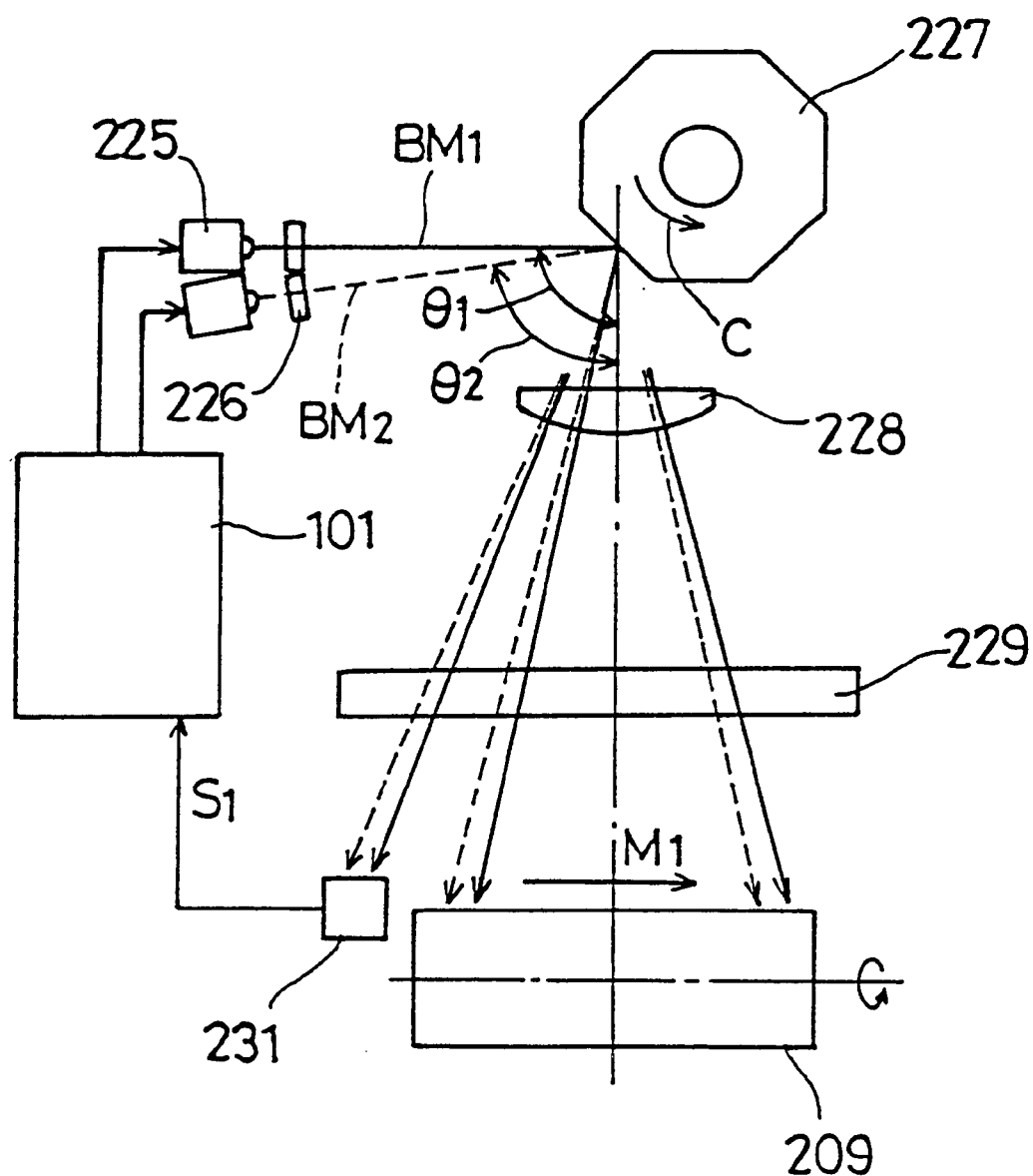
FIG. 9 is a plan view of an optical unit shown in FIG. 8.

FIG. 8 is an illustrative drawing showing a configuration of the image forming unit 204 according to the embodiment of the present invention. FIG. 9 is a plan view of the optical unit 211 shown in FIG. 8. In FIGS. 8 and 9, the same elements as those of FIG. 7 are referred to by the same numerals, and a description thereof will be omitted.

The optical unit 211 controls directions of light beams BM1 and BM2 having intensity modulations, thereby scanning these beams in a main-scan direction indicated by an arrow M1.

The optical unit 211 includes semiconductor lasers 225 and 226, a polygon mirror 227, an fθ lens 228, reflection mirrors 229 and 230, and an optical sensor 231.

The light beams BM1 and BM2 emitted from the semiconductor lasers 225 and 226, respectively, are directed to the polygon mirror 227 via respective adjustment units. The polygon mirror 227 is rotated by a motor 234 in a direction indicated by an arrow C so as to change directions of the reflected light beams BM1 and BM2. This achieves scanning of the beams in the direction M1.

The light beams BM1 and BM2 reflected by the polygon mirror 227 are further reflected by the mirror 230 to reach the optical sensor 231. After this, the light beams BM1 and BM2 are reflected by the reflection mirrors 229 to be directed to the photosensitive drum 209. A detection signal S1 output from the optical sensor 231 is supplied to an optical-system-control circuit 101. The optical-system-control circuit 101 controls various operation timings based on the detection signal supplied from the optical sensor 231.

Figure 1:
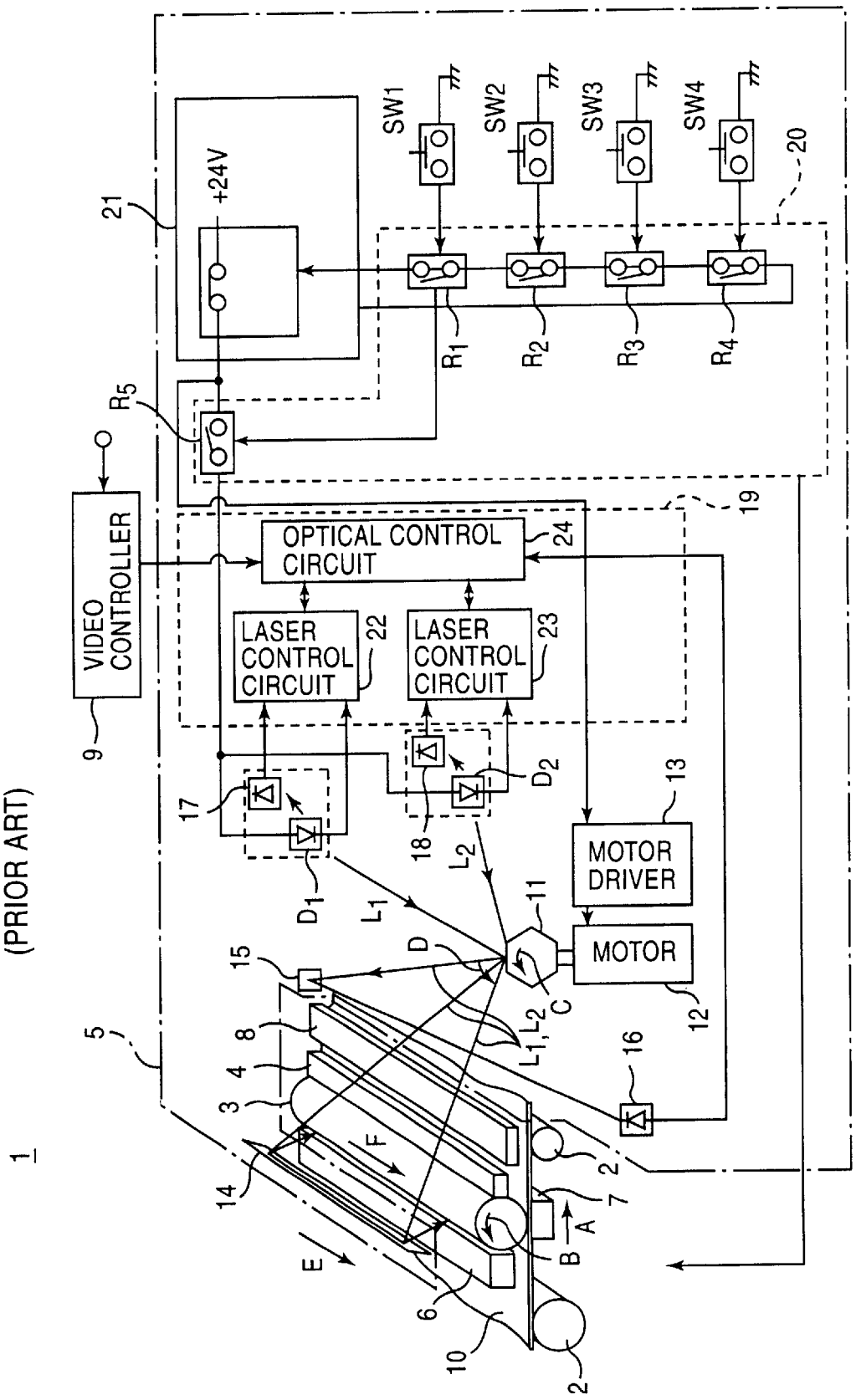
FIG. 1 is a block diagram of a related-art laser printer.
Figure 2:
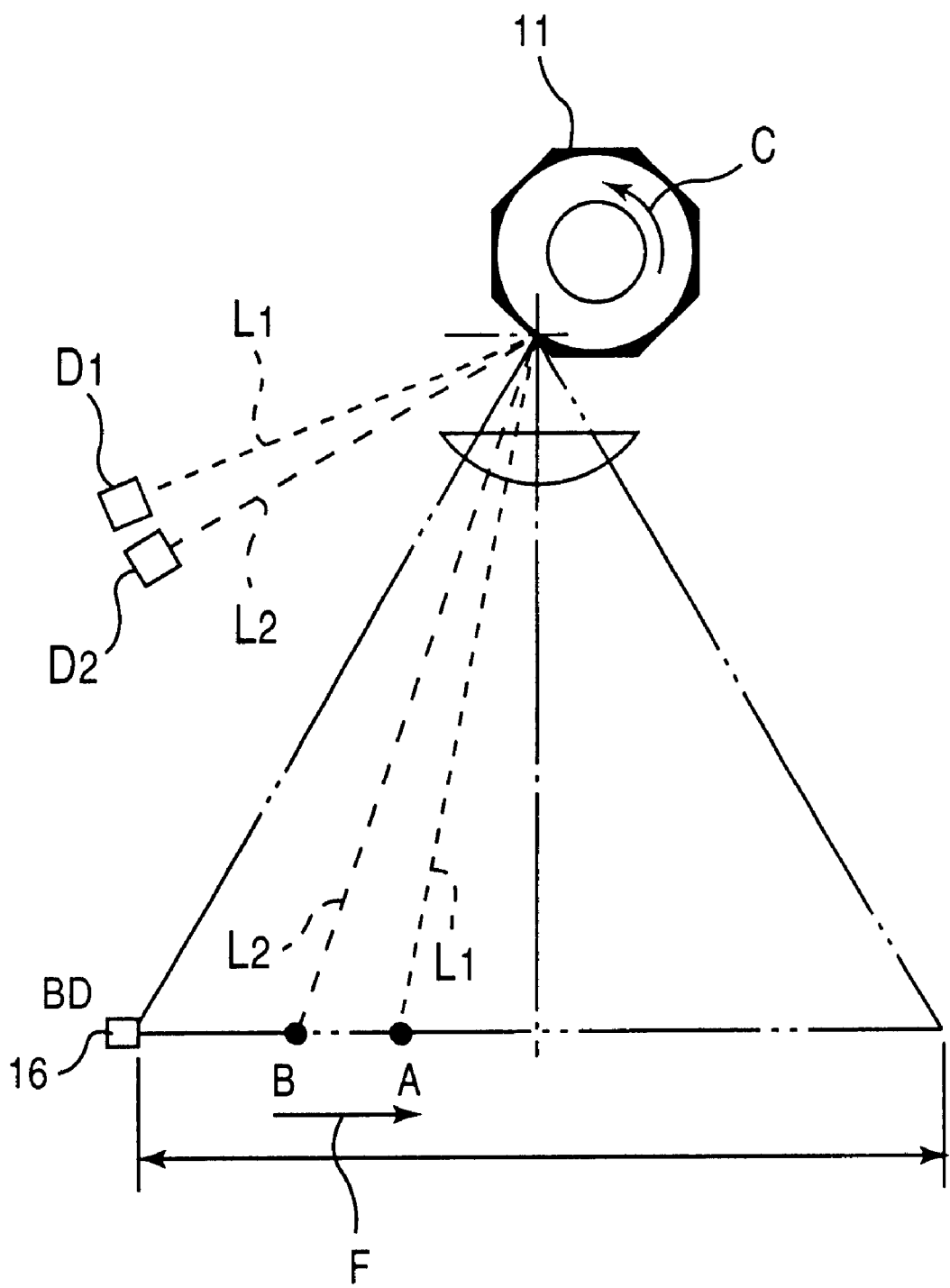
FIG. 2 is an illustrative drawing for explaining a displacement between laser beams in their scan direction.
Figure 3:
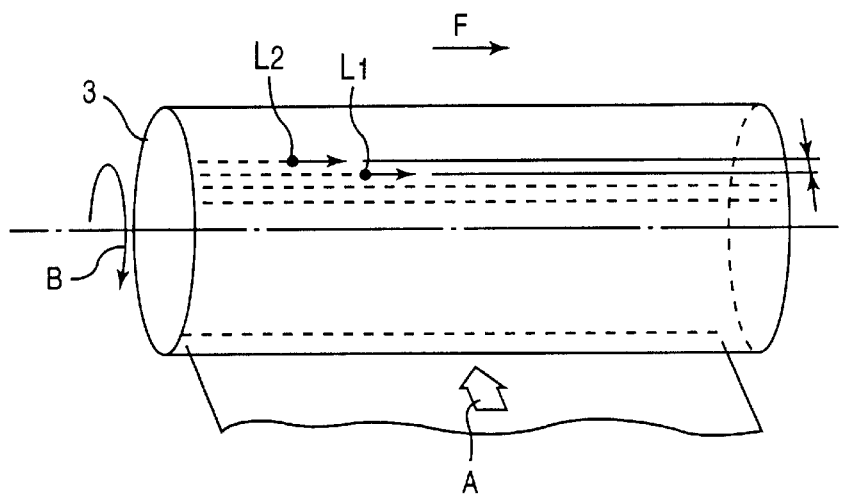
FIG. 3 is an illustrative drawing for explaining a displacement between the laser beams in their sub-scan direction.
Figure 4A:
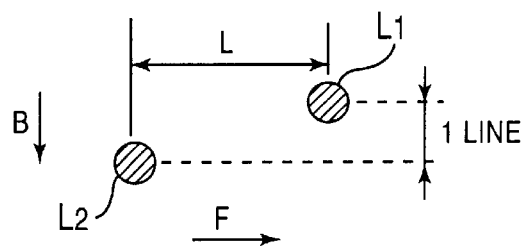
FIGS. 4A and 4B are illustrative drawings showing a positional relation between the laser beams.
Figure 4B:
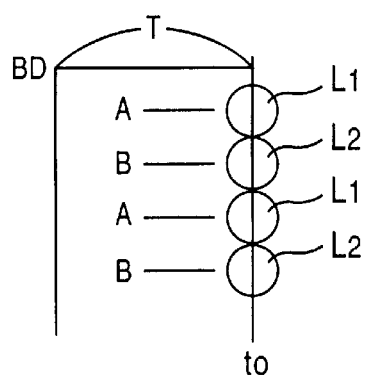
Figure 5:
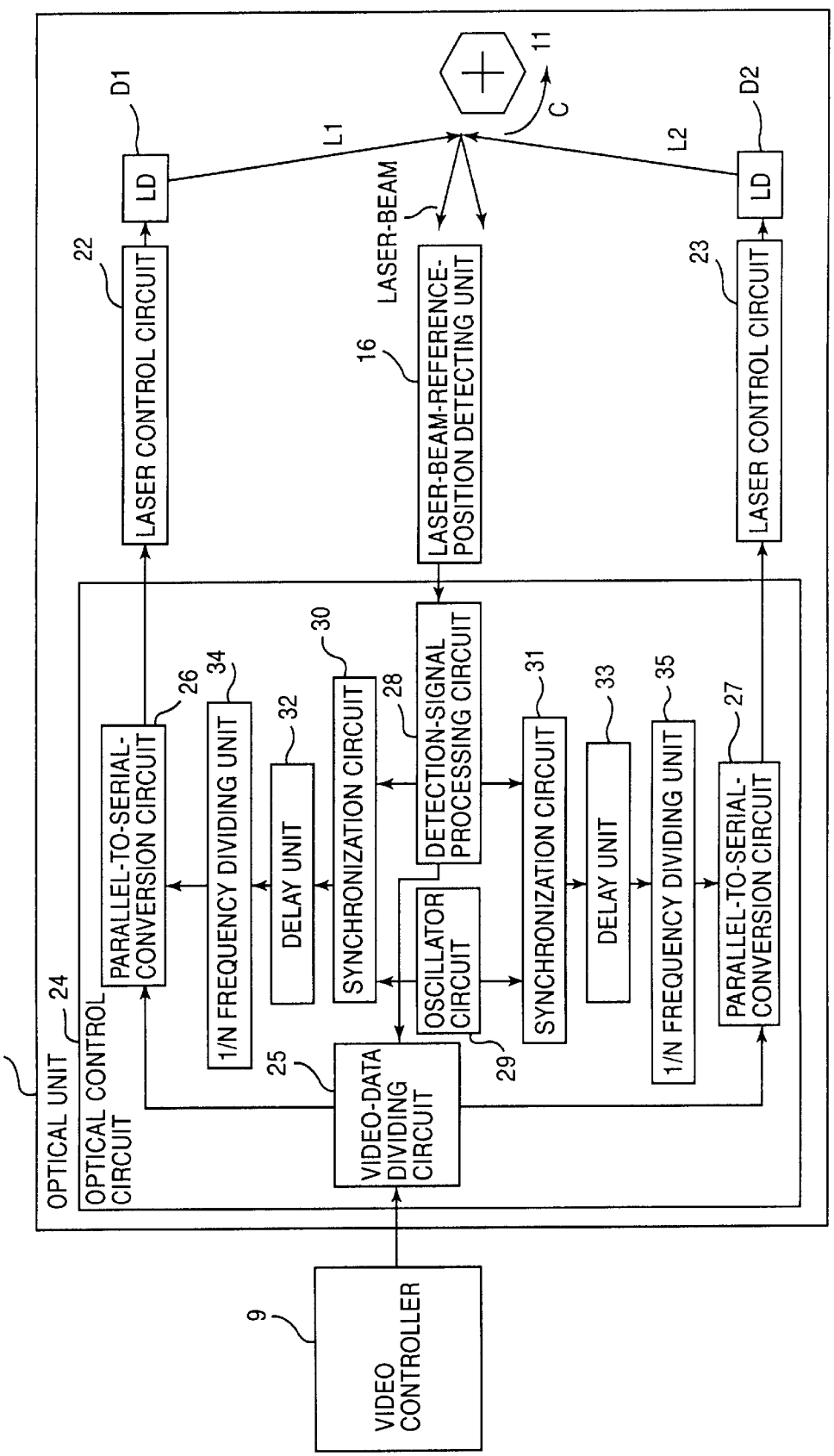
FIG. 5 is a block diagram of a related-art optical control circuit.
Figure 10:
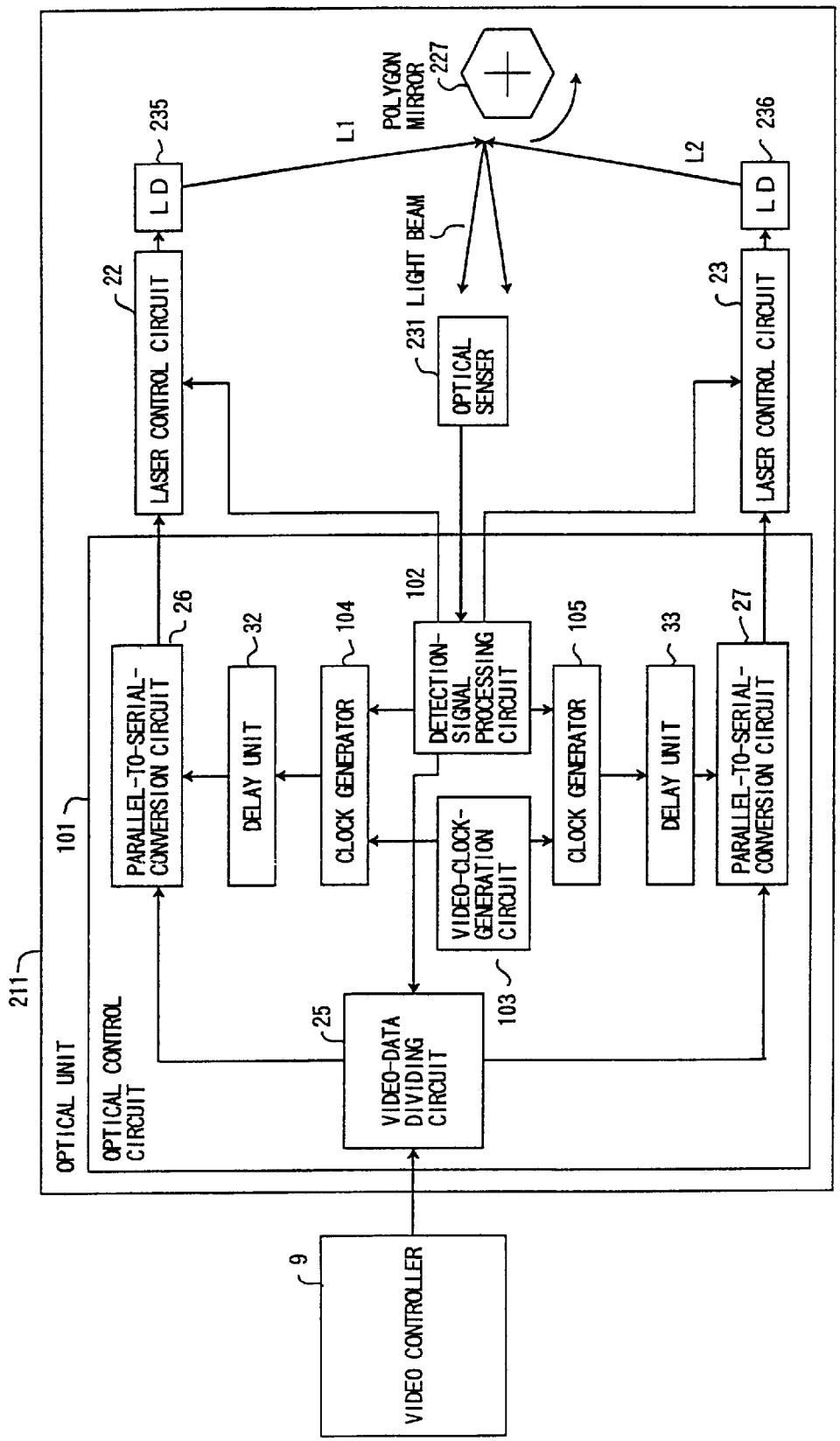
FIG. 10 is a block diagram of the optical unit of the image forming device according to the embodiment of the present invention.

FIG. 10 is a block diagram of the optical unit of the image forming device according to the embodiment of the present invention. In FIG. 10, the same elements as those of FIG. 5 are referred to by the same elements, and a description thereof will be omitted.

The optical-system-control circuit 101 in FIG. 10 includes a detection-signal processing circuit 102, a video-clock-generation circuit 103, and clock generators 104 and 105 in addition to the video-data splitting circuit 25, the parallel-to-serial-conversion circuits 26 and 27, and the delay units 32 and 33.

The video-data splitting circuit 25 receives video data from the video controller 9, and distributes video lines alternately to the parallel-to-serial-conversion circuit 26 or to the parallel-to-serial-conversion circuit 27.

The parallel-to-serial-conversion circuit 26 attends to parallel-to-serial conversion of the video data supplied from the video-data splitting circuit 25 in synchronism with a clock signal supplied from the clock generator 104. Serial data output from the parallel-to-serial-conversion circuit 26 is supplied to the laser control circuit 22. Based on the supplied serial video data, the laser control circuit 22 controls a semiconductor laser 235.

The parallel-to-serial-conversion circuit 27 attends to parallel-to-serial conversion of the video data supplied from the video-data splitting circuit 25 in synchronism with a clock signal supplied from the clock generator 105. Serial data output from the parallel-to-serial-conversion circuit 27 is supplied to the laser control circuit 23. Based on the supplied serial video data, the laser control circuit 23 controls a semiconductor laser 236.

The detection-signal processing circuit 102 receives detection signals from the optical sensor (BD sensor) 231, and distinguishes a detection signal corresponding to the light beam BM1 and a detection signal corresponding to the light beam BM2. The respective detection signals are supplied to the clock generators 104 and 105 and to the laser control circuits 22 and 23.

Each of the clock generators 104 and 105 receives a video clock signal from the video-clock-generation circuit 103. In response to the detection signal supplied from the detection-signal processing circuit 102, each of the clock generators 104 and 105 outputs the video clock signal supplied from the video-clock-generation circuit 103.

The video clock signals output from the clock generators 104 and 105 are supplied to the delay units 32 and 33, respectively. The delay units 32 and 33 delay the supplied video clock signals by a predetermined delay time, and supply the delayed video clock signals to the parallel-to-serial-conversion circuits 26 and 27, respectively. Here, the predetermined delay time corresponds to a time gap between a beam detection by the optical sensor 231 and a start of image creation.

In the following, the detection-signal processing circuit 102 will be described in detail.

Figure 11:
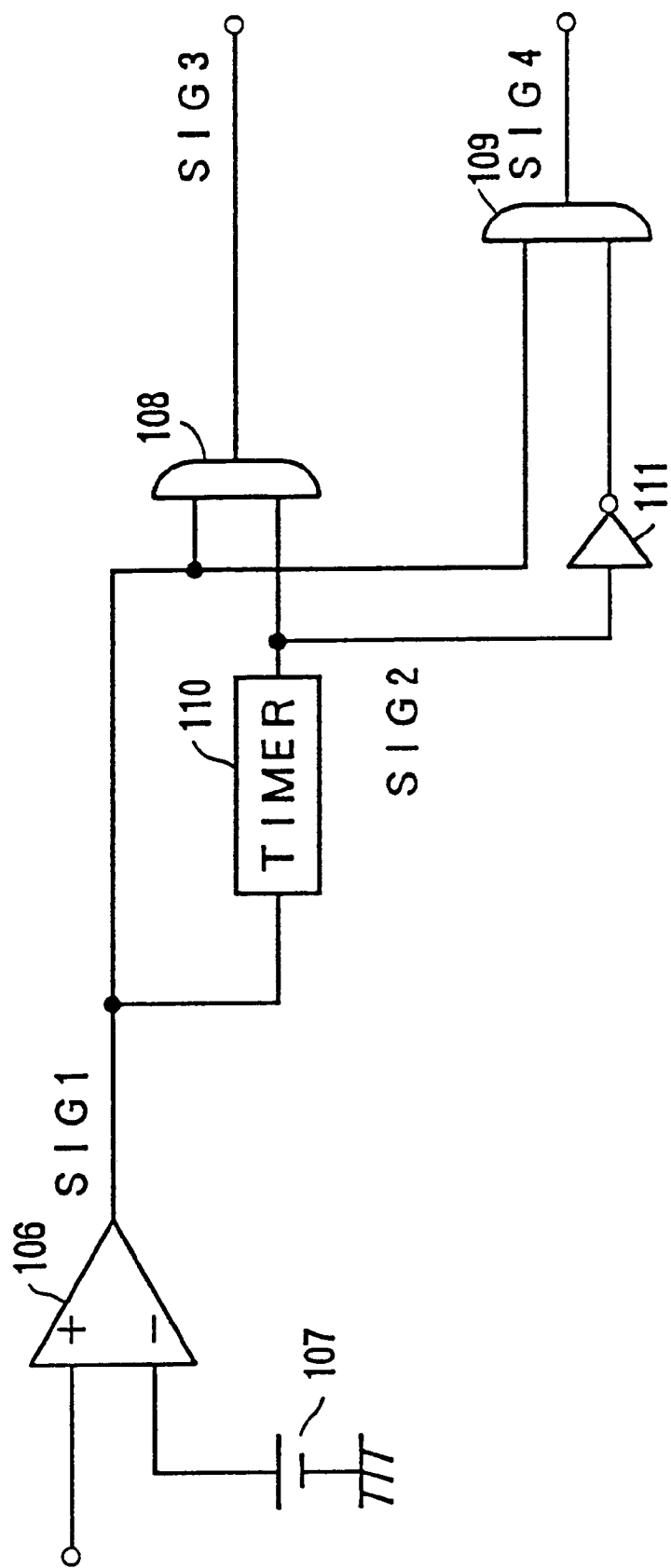
FIG. 11 is a block diagram of a detection-signal processing circuit of FIG. 10 according to the embodiment of the present invention.

FIG. 11 is a block diagram of the detection-signal processing circuit 102 of FIG. 10 according to the embodiment of the present invention.

The detection-signal processing circuit 102 includes a comparator 106, a reference-voltage power source 107, an AND gate 108, an AND gate 109, a timer 110, and an inverter 111.

A detection signal detected by the optical sensor 231 is supplied to a non-inverted input node of the comparator 106. An inverted input node of the comparator 106 receives a reference voltage from the reference-voltage power source 107. The comparator 106 outputs a high-level signal if the detection signal has a higher voltage level than the reference voltage, and outputs a low-level signal if the detection signal has a lower voltage level than the reference voltage.

The output of the comparator 106 is supplied to the AND gates 108 and 109 as well as to the timer 110. The timer 110 detects a falling edge of the detection signal, and generates a pulse that keeps a high voltage level at least for a time period T. The output pulse of the timer 110 is supplied to the AND gate 108 and the inverter 111.

The AND gate 108 obtains an AND logic of the detection signal detected by the optical sensor 231 and the output pulse of the timer 110.

The inverter 111 inverts the output of the timer 110, and supplies the inverted signal to the AND gate 109. The AND gate 109 obtains an AND logic of the detection signal detected by the optical sensor 231 and the signal inverse to the output pulse of the timer 110.

Figure 12:
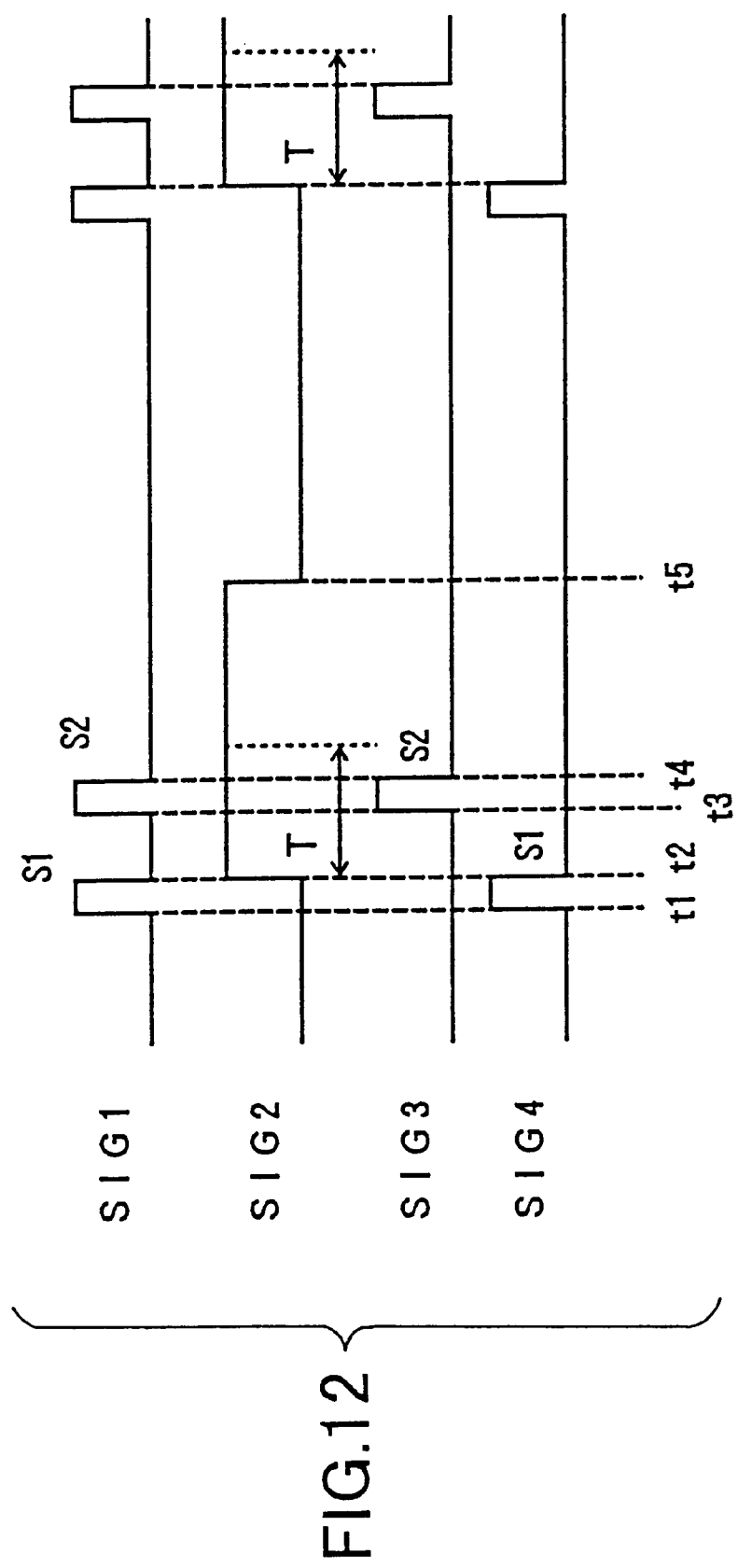
FIG. 12 is a timing chart for explaining operation of the detection-signal processing circuit.

FIG. 12 is a timing chart for explaining operation of the detection-signal processing circuit 102.

In FIG. 12, a signal SIG1 is the output of the comparator 106, which is logically the same as the detection signal supplied form the optical sensor 231. A signal SIG2 is the output of the timer 110. Further, a signal SIG3 is an output of the AND gate 108, and a signal SIG4 is an output of the AND gate 109.

As can be seen from the signal SIG1 shown in FIG. 12, a pulse S1 corresponding to the light beam BM1 and a pulse S2 corresponding to the light beam BM2 are supplied, and are apart from each other by less than the time period T.

When the detection signal becomes high by detecting the light beam BM1 at a time t1, the AND gate 109 receives high-level signals at both inputs thereof. Namely, the output of the inverter 111 is high since the output SIG2 of the timer 110 is still low, and the output of the comparator 106 is high. As a result, the output SIG4 of the AND gate 109 becomes high.

As the detection signal falls to the low level at a time t2, the output SIG2 of the timer 110 rises to the high level. In response, the output of the inverter 111 becomes low. The AND gate 109 thus receives low level signals at both inputs thereof. As a result, the output SIG4 of the AND gate 109 becomes low. As for the inputs of the AND gate 108, the output SIG2 of the timer 110 is high, but the output SIG1 of the comparator 106 is low. As a result, the output SIG3 of the AND gate 108 keeps the low level thereof.

At a time t3, the detection signal SIG1 rises to the high level again in response to detection of the light beam BM2. The output SIG2 of the timer 110 remains high because the output SIG2 maintains a high level thereof at least for the time period T starting from the time t2. As a result, the AND gate 108 receives high level signals at both inputs thereof, thereby producing a high level signal as the output SIG3. Since the output of the inverter 111 remains low, the output SIG4 of the AND gate 109 stays at the low level.

At a time t4, the detection signal falls to the low level after the detection of the light beam BM2. At this point of time, the output SIG2 of the timer 110 still maintains the high level thereof since the high level stays at least for the time period T starting from the time t2. Since the output SIG1 of the comparator 106 becomes low, the AND gate 108 has the output SIG3 thereof changed to the low level. Since the output of the inverter 111 is kept at the low level, the output SIG4 of the AND gate 109 still stays at the low level.

At a time t5, the output SIG2 of the timer 110 changes to the low level. Since the detection signal is at the low level, however, the outputs of the AND gates 108 and 109 stay at the low level.

In this manner, the AND gate 109 outputs a pulse S1 only, and the AND gate 108 outputs a pulse S2 only. Accordingly, the pulses S1 and S2 corresponding to the respective light beams BM1 and BM2 are distinguished, and are extracted as a separate pulse.

In what follows, the clock generators 104 and 105 will be described.

Figure 13:
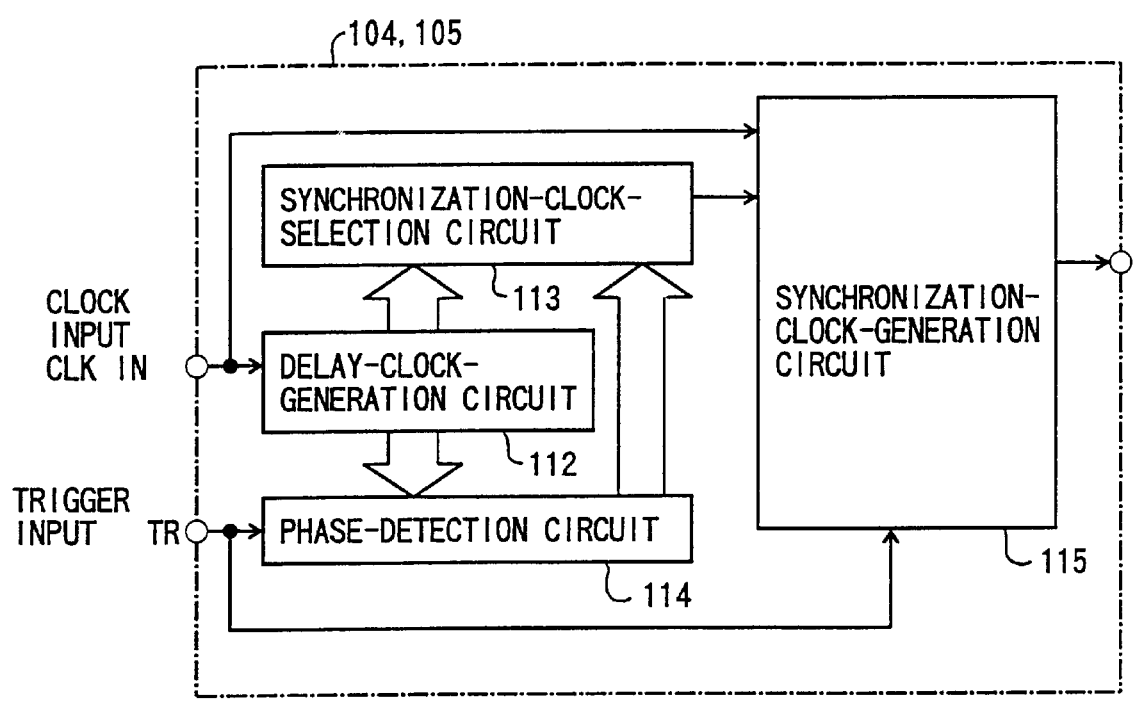
FIG. 13 is a block diagram of a clock generator used in the image forming device according to the embodiment of the present invention.

FIG. 13 is a block diagram of a clock generator used in the image forming device according to the embodiment of the present invention.

The clock generators 104 and 105 can be implemented by using relatively inexpensive ICs that are commercially available. For example, a standard clock generator MM66234FP manufactured by Mitsubishi Electric Corporation may be used.

The clock generator (104 or 105) of FIG. 13 includes a delay-clock-generation circuit 112, a synchronization-clock-selection circuit 113, a phase-detection circuit 114, and a synchronization-clock-generation circuit 115. The clock generator receives the video clock from the video-clock-generation circuit 103 as a clock input, and further receives an output of the detection-signal processing circuit 102 as a trigger input.

The clock generator outputs the video clock in synchronism with the detection signal supplied from the detection-signal processing circuit 102 where the video clock is supplied from the video-clock-generation circuit 103.

Figure 14:
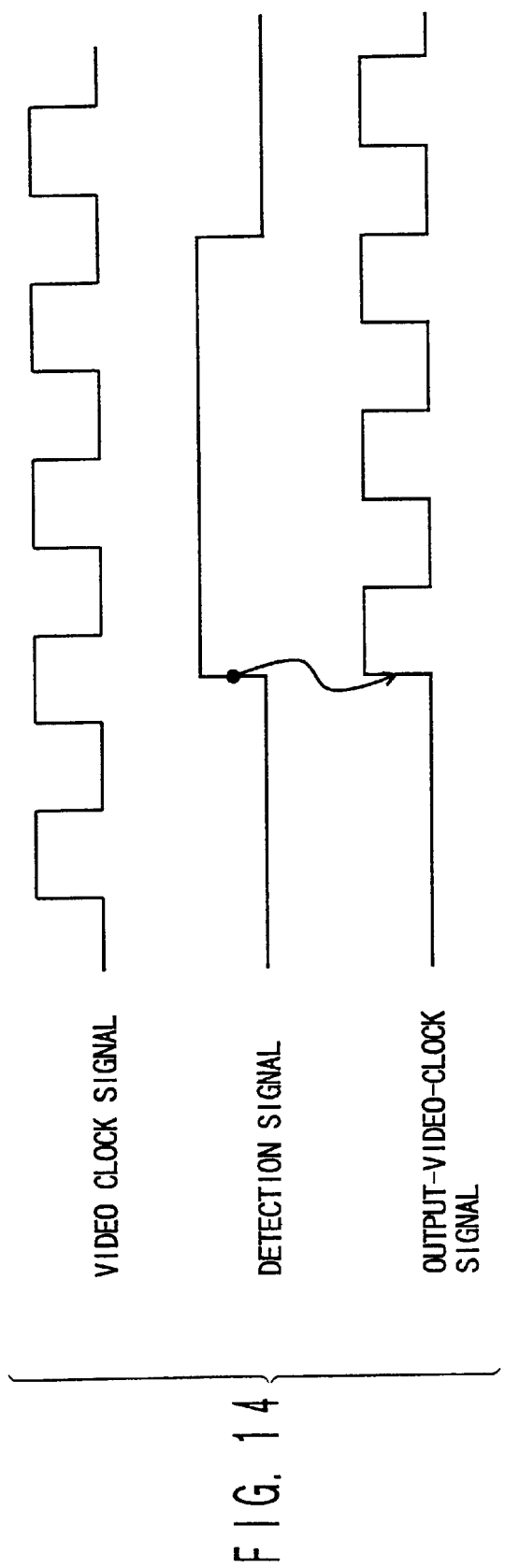
FIG. 14 is a timing chart for explaining operation of the clock generator according to the embodiment of the present invention.

FIG. 14 is a timing chart for explaining operation of the clock generator according to the embodiment of the present invention.

FIG. 14 shows the video clock signal generated by the video-clock-generation circuit 103, the detection signal generated by the detection-signal processing circuit 102, and an output-video-clock signal generated by the clock generator 104 (or 105).

As shown in FIG. 14, the clock generator 104 (or 105) outputs the video clock supplied from the video-clock-generation circuit 103 as the output-video-clock signal such that the output timing of the output-video-clock signal is in synchronism with the rising edge of the detection signal supplied from the detection-signal processing circuit 102.

Here, the output timing of the output-video-clock signal is determined by a timing of the detection signal supplied from the detection-signal processing circuit 102, and is adjustable independently of the clock cycle of the video clock supplied from the video-clock-generation circuit 103. In other words, the output timing of the output-video-clock signal is adjustable by a displacement that is smaller than a clock cycle of the video clock supplied from the video-clock-generation circuit 103, and such a displacement is not bounded to be a predetermined fraction of a clock cycle.

The video-clock signals output from the clock generators 104 and 105 are delayed by the delay units 32 and 33, respectively, by a predetermined delay length. The delayed video-clock signals are then supplied to the parallel-to-serial-conversion circuits 26 and 27, respectively. Each of the parallel-to-serial-conversion circuits 26 and 27 outputs video data after converting the video data into serial data in response to the corresponding video-clock signal. The video data is then supplied to the laser control circuits 22 and 23.

In what follows, the laser control circuits 22 and 23 will be described in detail.

Figure 15:
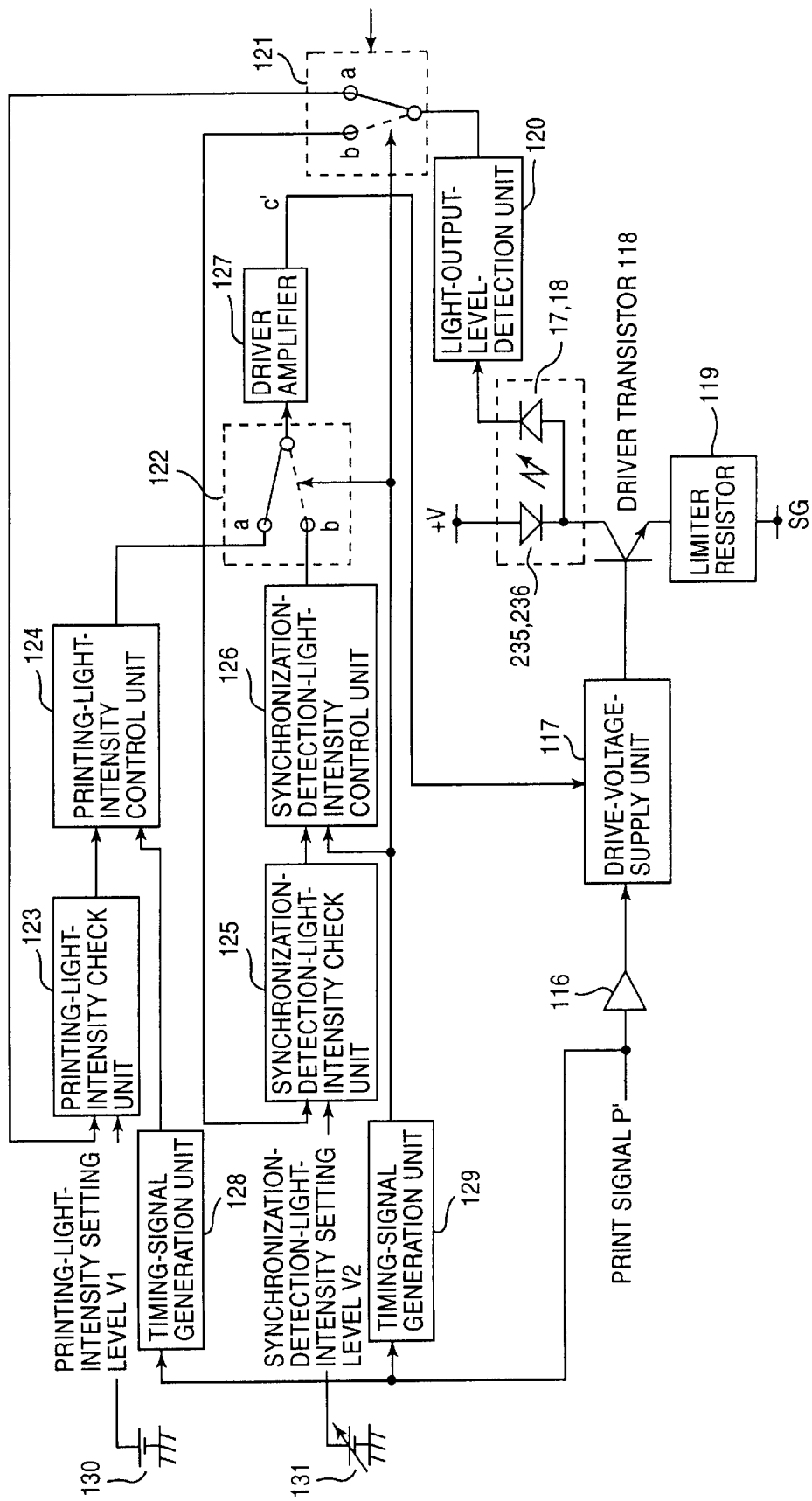
FIG. 15 is a block diagram of a laser control circuit used in the image forming device according to the embodiment of the present invention.

FIG. 15 is a block diagram of a laser control circuit used in the image forming device according to the embodiment of the present invention.

The laser control circuit 22 (or 23) includes a buffer amplifier 116, a drive-voltage-supply unit 117, a driver transistor 118, a limiter resistor 119, a light-output-level-detection unit 120, switches 121 and 122, a printing-light-intensity check unit 123, a printing-light-intensity control unit 124, a synchronization-detection-light-intensity check unit 125, a synchronization-detection-light-intensity control unit 126, a driver amplifier 127, timing-signal generation units 128 and 129, a printing-light-intensity-level setting unit 130, and a synchronization-detection-light-intensity setting unit 131.

The buffer amplifier 116 amplifies the video data supplied from the parallel-to-serial-conversion circuit 26 (or 27). The amplified video data is then supplied to the drive-voltage-supply unit 117. The drive-voltage-supply unit 117 supplies a drive voltage to a base node of the driver transistor 118 where the drive voltage corresponds to the video data supplied from the buffer amplifier 116.

The driver transistor 118 has a collector thereof connected to the semiconductor laser 235 (or 236) and an emitter thereof connected to the ground via the limiter resistor 119. The collector current of the driver transistor 118 is controlled by the drive voltage supplied from the drive-voltage-supply unit 117, so that a drive current flowing through the semiconductor laser 235 (or 256) is controlled accordingly. The semiconductor laser 235 (or 236) emits light that has an intensity commensurate with the drive current. In this manner, the light intensity of the light beam BM1 (or BM2) directed to the photosensitive drum 3 is controlled.

The light beam BM1 (or BM2) generated by the semiconductor laser 235 (or 236) is supplied to the laser-power-adjustment beam-detection unit 17 (or 18). The laser-power-adjustment beam-detection unit 17 (or 18) detects the light intensity of the light beam BM1 (or BM2). The detected intensity is reported to the light-output-level-detection unit 120.

The light-output-level-detection unit 120 generates a detection signal commensurate with the intensity signal supplied from the laser-power-adjustment beam-detection unit 17 (or 18). The detection signal is supplied from the light-output-level-detection unit 120 to the switch 121. The switch 121 is switched by a timing signal B, which rises in response to a falling edge of a timing signal A. The switch 121 supplies the detection signal coming from the light-output-level-detection unit 120 to either the printing-light-intensity check unit 123 or the synchronization-detection-light-intensity check unit 125.

The printing-light-intensity check unit 123 receives the detection signal from the switch 121, and, also, receives a printing-light-intensity setting level V1 from the printing-light-intensity-level setting unit 130. In response to the detection signal supplied from the switch 121, the printing-light-intensity check unit 123 provides the printing-light-intensity setting level V1 to the printing-light-intensity control unit 124. the printing-light-intensity control unit 124 receives the output signal of the printing-light-intensity check unit 123 and the timing signal A that is generated at a start of a print signal. In response to the timing signal A, the printing-light-intensity control unit 124 outputs the signal supplied from the printing-light-intensity check unit 123.

The signal output from the printing-light-intensity control unit 124 is supplied to the switch 122.

The synchronization-detection-light-intensity check unit 125 receives the detection signal from the switch 121, and, also, receives a synchronization-detection-light-intensity setting level V2 from the synchronization-detection-light-intensity setting unit 131. In response to the detection signal supplied from the switch 121, the synchronization-detection-light-intensity check unit 125 provides the synchronization-detection-light-intensity setting level V2 to the synchronization-detection-light-intensity control unit 126.

The synchronization-detection-light-intensity control unit 126 receives the output signal of the synchronization-detection-light-intensity check unit 125, and further receives the timing signal B. In response to the timing signal B, the synchronization-detection-light-intensity control unit 126 outputs the signal supplied from the synchronization-detection-light-intensity check unit 125.

The signal output from the synchronization-detection-light-intensity control unit 126 is supplied to the switch 122.

The switch 122 receives the output signal of the printing-light-intensity control unit 124 and the output signal of the synchronization-detection-light-intensity control unit 126. In response to the timing signal B, the switch 122 selects either the output of the printing-light-intensity control unit 124 or the output of the synchronization-detection-light-intensity control unit 126, and outputs the selected signal.

The signal output from the switch 122 is supplied to the driver amplifier 127. The driver amplifier 127 amplifies the supplied signal, and provides the amplified signal to the drive-voltage-supply unit 117.

Figure 16:
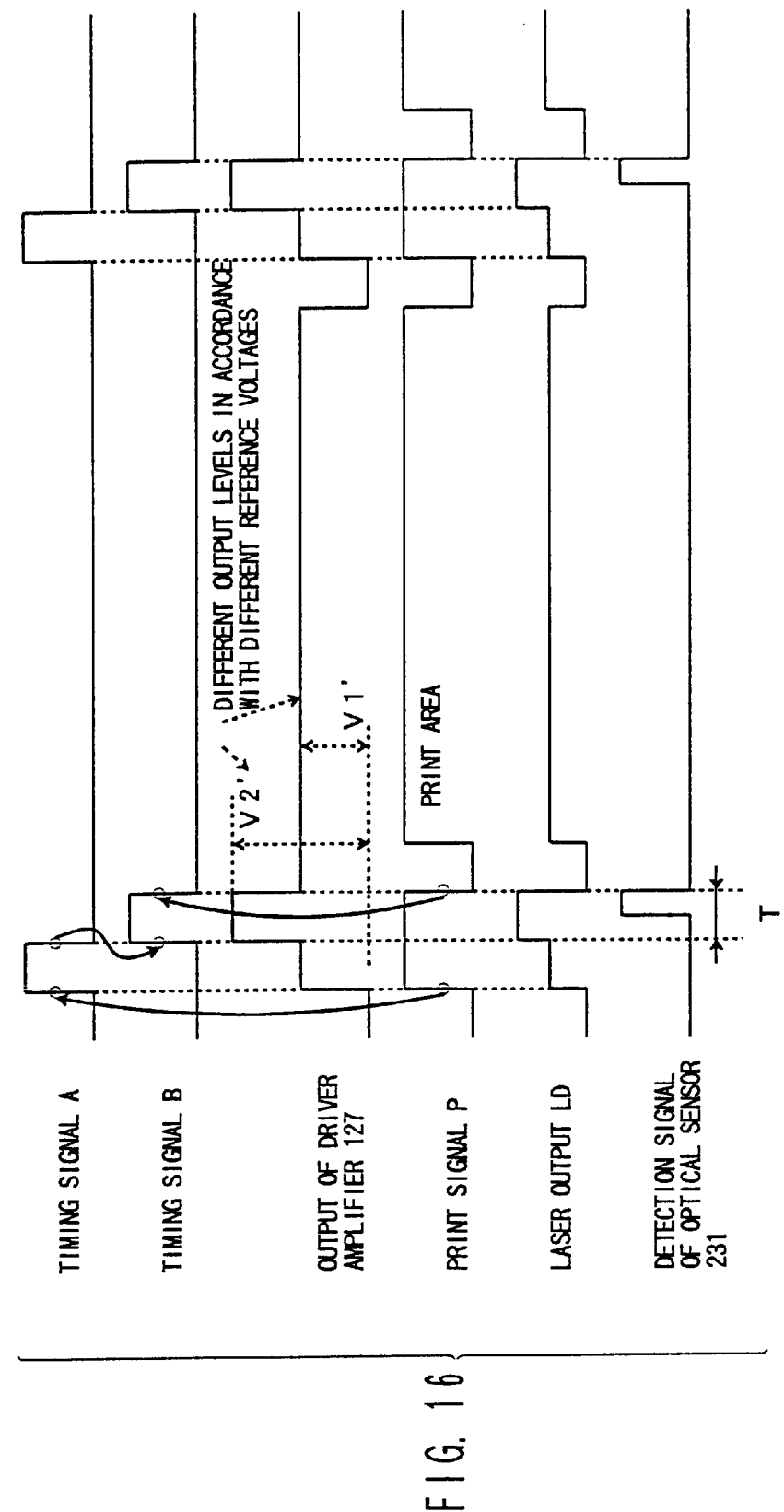
FIG. 16 is a timing chart for explaining operation of the laser control circuit used in the image forming device according to the embodiment of the present invention.

FIG. 16 is a timing chart for explaining operation of the laser control circuit used in the image forming device according to the embodiment of the present invention.

FIG. 16 shows the timing signal A, the timing signal B, the output of the driver amplifier 127, the print signal P, a laser output LD, and the detection signal of the optical sensor 231.

As the print signal P rises to the high level at a start of printing, the timing signal A changes to the high level in response. The rise of the timing signal A prompts the printing-light-intensity check unit 123 and the printing-light-intensity control unit 124 to start operation, so that the printing-light-intensity control unit 124 outputs the printing-light-intensity setting level V1. Since the switch 122 is coupled to a node a at this point of time, the printing-light-intensity setting level V1 is supplied to the drive-voltage-supply unit 117 via the driver amplifier 127.

As a result, the laser output LD having an intensity commensurate with the printing-light-intensity setting level V1 is produced by the semiconductor laser 235 (or 236).

After this, the timing signal A falls to the low level, and the timing signal B rises to the high level. In response, the switches 121 and 122 are coupled to the paths where the synchronization-detection-light-intensity check unit 125 and the synchronization-detection-light-intensity control unit 126 are provided. The synchronization-detection-light-intensity check unit 125 and the synchronization-detection-light-intensity control unit 126 start operation thereof, so that synchronization-detection-light-intensity control unit 126 outputs the synchronization-detection-light-intensity setting level V2. The synchronization-detection-light-intensity setting level V2 is supplied to the driver amplifier 127 via the switch 122, and is supplied from the driver amplifier 127 to the drive-voltage-supply unit 117.

As a result, the laser output LD having an intensity commensurate with the synchronization-detection-light-intensity setting level V2 is produced by the semiconductor laser 235 (or 236).

In this manner, the output of the semiconductor laser 235 (or 236) is set to an appropriate synchronization-detection-light intensity during the time period T for which the timing signal B stays at the high level. The timing signal B is activated immediately prior to an activation of a recording portion of the print signal that is to be 1 recorded on the photosensitive drum 3. The optical sensor 231 generates the detection signal during the time period T. During a period when the recording portion of the print signal is output, the switches 121 and 122 are switched such that the laser output LD is set to the printing-light-intensity setting level V1.

The synchronization-detection-light-intensity setting unit 131 is designed such as to allow adjustment of the synchronization-detection-light-intensity setting level V2. The adjustment of the synchronization-detection-light-intensity setting level V2 makes it possible to control a timing at which the detection-signal processing circuit 102 detects the detection signal generated by the optical sensor 231.

Figure 17:
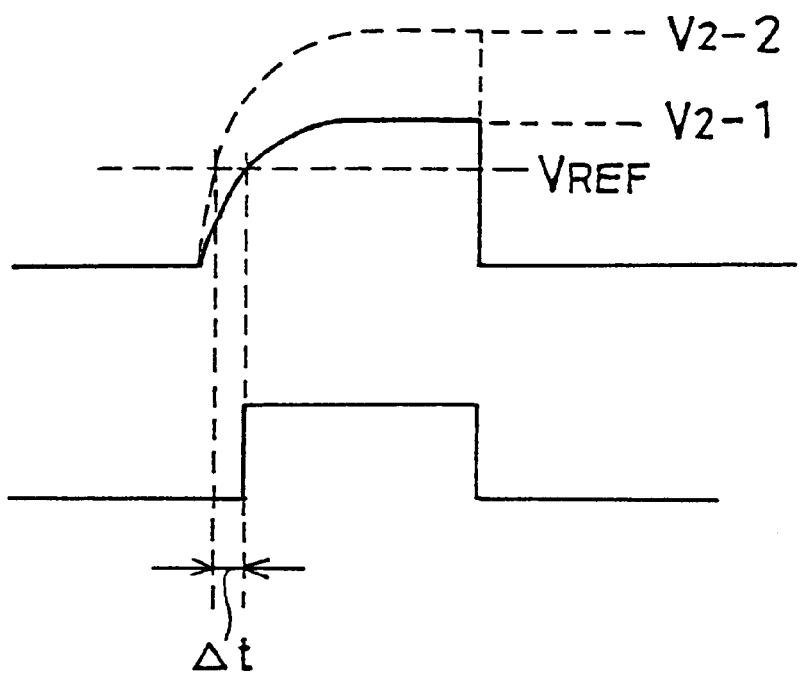
FIGS. 17A and 17B are timing charts for explaining a timing control achieved by the adjustment of a synchronization-detection-light-intensity setting level in the image forming device according to the embodiment of the present invention.

FIGS. 17A and 17B are timing charts for explaining a timing control achieved by the adjustment of the synchronization-detection-light-intensity setting level V2 in the image forming device according to the embodiment of the present invention. FIG. 17A shows an intensity of a laser beam (i.e., light beam BM1 or BM2), and FIG. 17B shows a detection signal detected by the detection-signal processing circuit 102.

When the synchronization-detection-light-intensity setting level V2 is set to a level V2-1 by the synchronization-detection-light-intensity setting unit 131, an intensity of the laser beam has a waveform as shown by a solid line in FIG. 17A, which also illustrates the reference voltage Vref generated by the reference-voltage power source 107 of the detection-signal processing circuit 102. The comparator 106 of the detection-signal processing circuit 102 thus outputs a detection signal at a timing as shown by a solid line in FIG. 17B.

When the synchronization-detection-light-intensity setting unit 131 sets the synchronization-detection-light-intensity setting level V2 to a level V2-2, the intensity of the laser beam has a waveform as shown by a dashed line in FIG. 17A. As a result, the comparator 106 of the detection-signal processing circuit 102 outputs a detection signal at a timing shown by a dashed line in FIG. 17B. In this manner, a change of the synchronization-detection-light-intensity setting level V2 from the level V2-1 to the level V2-2 advances the timing of signal detection by a time length $\delta t$.

As described above, the synchronization-detection-light-intensity setting unit 131 can adjust the synchronization-detection-light-intensity setting level V2 so as to control the timing of signal detection by the adjustment of laser beam intensity.

In the following, an overall operation of the image forming device will be described.

FIGS. 18A through 18K are timing charts for explaining operation of the image forming device according to the embodiment of the present invention.

Figure 18:
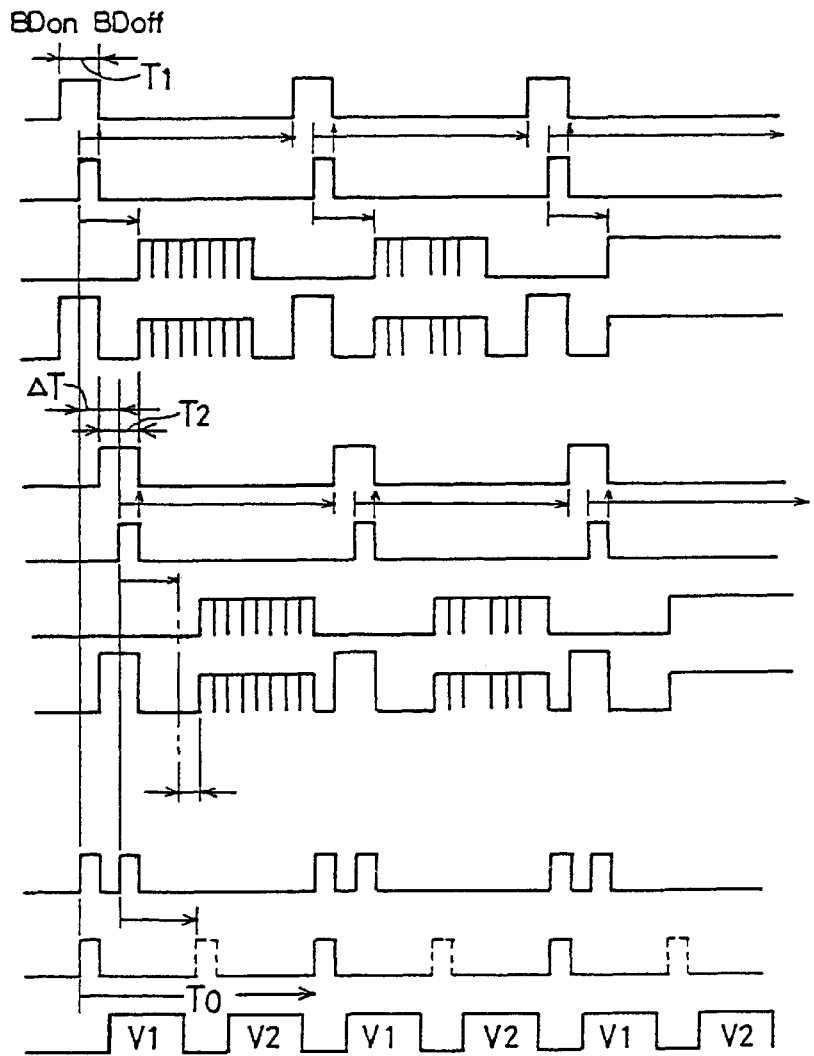
FIGS. 18A through 18K are timing charts for explaining operation of the image forming device according to the embodiment of the present invention.

FIG. 18A shows the timing signal B for the light beam BM1, and FIG. 18B exhibits the detection signal of the light beam BM1. FIG. 18C illustrates the print signal for the light beam BM1, and FIG. 18D demonstrates the output intensity of the light beam BM1. FIG. 18E shows the timing signal B for the light beam BM2, and FIG. 18F exhibits the detection signal of the light beam BM2. FIG. 18G illustrates the print signal for the light beam BM2, and FIG. 18H demonstrates the output intensity of the light beam BM2. Further, FIG. 18I shows the detection signal of the optical sensor 231, and FIG. 18J is an illustration of a control signal used for controlling various mechanisms in the device. Finally, FIG. 18K shows a control signal for controlling video data.

During the time period T1 as shown in FIG. 18A, the light beam BM1 has an intensity thereof equal to the synchronization-detection-light intensity as shown in FIG. 18D. During this time period, also, the optical sensor 231 detects a synchronization reference position as shown in FIG. 18B. By using the synchronization reference position of FIG. 18B as a reference, a timing at which the print signal is output as shown in FIG. 18C is controlled.

The light beam BM2 exhibits the synchronization-detection-light intensity as shown in FIG. 18H during a time period T2 that comes after the time period T1 with a predetermined time delay $\delta T$ as shown in FIG. 18E. During the time period T2 for which the light beam B2 has the synchronization-detection-light intensity, the optical sensor 231 detects a synchronization reference position as shown in FIG. 18F. By using the synchronization reference position of FIG. 18F as a reference, a timing at which the print signal is output as shown in FIG. 18G is controlled.

In response to the output signal of the optical sensor 231 shown in FIG. 18I, mechanisms for rotation of the photosensitive drum 3 and the like are controlled as shown in FIG. 18J, and timings of video data are controlled as shown in FIG. 18K. As shown in FIGS. 18J and 18K, two-line worth of video data V1 and V2 is supplied for each period T0 during which the mechanisms for the photosensitive drum 3 and the like complete an operation for one cycle.

In this manner, the video data is supplied at an end of a predetermined time period after the detection of the detection signal by the optical sensor 231, and is recorded on the photosensitive drum 3 as a latent image. The time period that controls the timing of video-data supply is not controlled on a clock-cycle-wise basis, but is controlled by having the clock generator 104 generate a clock in synchronism with the detection signal from the optical sensor 231 and by having the delay units 32 and 33 delay the generated clock by a predetermined time length. Because of this configuration, a timing displacement that is bound to exhibit a shift of at least one clock cycle can be avoided, and the video data can be supplied at a timing that is appropriately determined by the detection signal from the optical sensor 231.

Further, a finer adjustment is achieved by controlling the synchronization-detection-light-intensity setting level V2 in the laser control circuits 22 and 23. Since the control of the synchronization-detection-light-intensity setting level V2 permits control of a signal rise of the detection signal detected by the optical sensor 231, a minute timing adjustment can be made.

The embodiment described above is directed to use of two synchronized laser beams, but can be modified easily to use of more than two synchronized laser beams.

Further, the light beams used in the present invention are not limited to laser beams, and the embodiment described above can be applicable to any device which operates by scanning light beams at predetermined timings.

The present embodiment may be applied to a color-printer device based on a tandem-type electrophotograph scheme.

In the following, an example in which the present invention is applied to tandem-type electrophotograph color printer will be described with reference to the accompanying drawings.

A tandem-type electrophotograph color printer separately generates images of different colors (yellow, magenta, cyan, and black) on respective photosensitive drums, and transfers the images successively onto a print sheet to superimpose images one over another to create a color image. The present invention is applicable to such a printer device.

Figure 19:
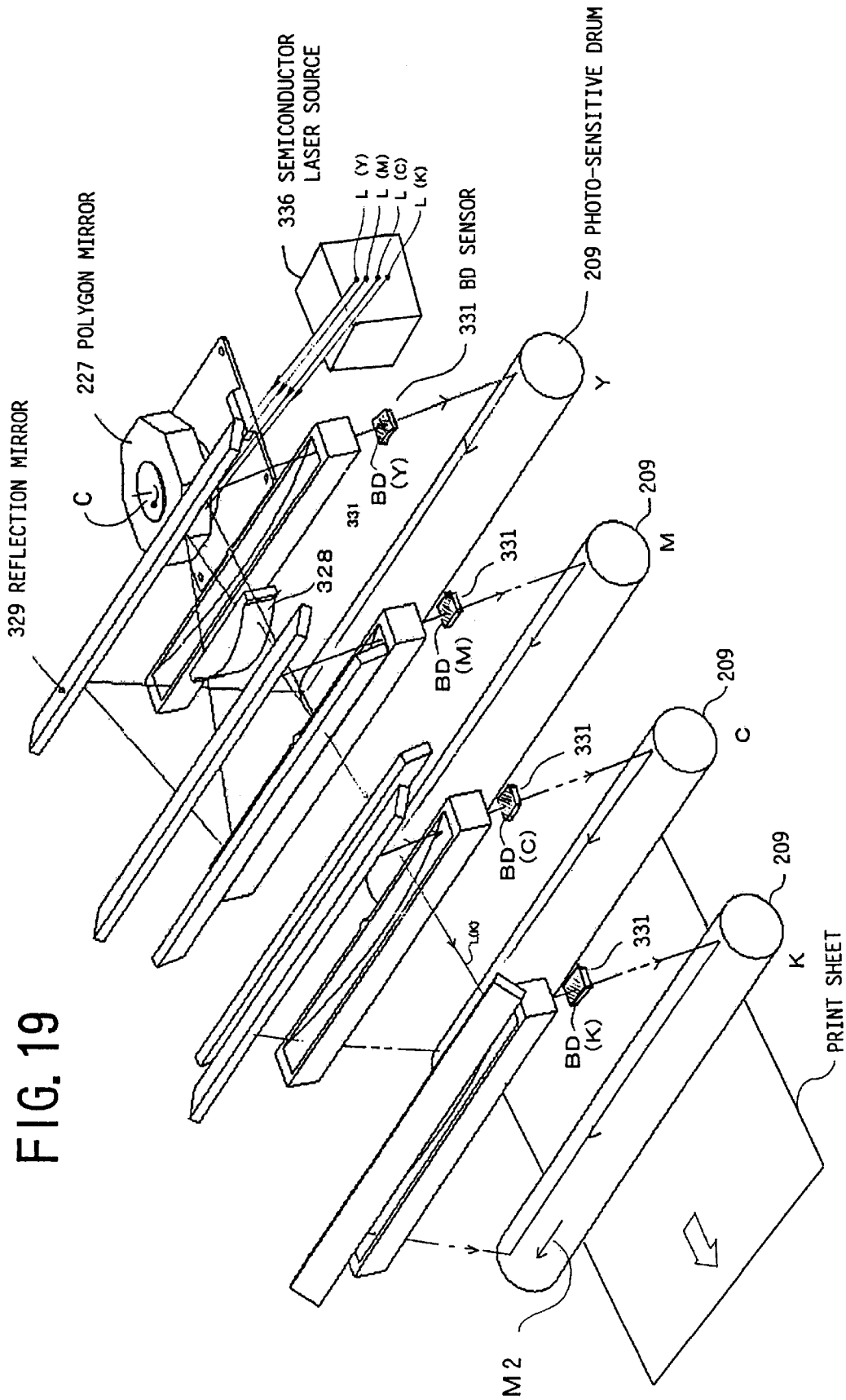
FIG. 19 is a schematic diagram of a scan optical system where drums are arranged in tandem.

FIG. 19 is a schematic diagram of a scan optical system where drums are arranged in tandem.

In this embodiment, four light beams are scanned simultaneously by a single polygon mirror, and sweep over the respective photo-sensitive drums. BD (beam detection) sensors are provided for the purpose of detecting the respective beams to indicate the start position of a scan.

Positions of the BD sensors shown in the figure are not an indication of actual positions of the BD sensors, but is provided merely for the purpose of indicating presence of the beam-detection means. Actual positioning of the BD sensors may be different from that shown in the figure as long as the sensors can perform the expected functions.

In the following, a color-image-formation unit 190 will be described.

FIG. 19 shows a configuration of a color-image-formation unit according to the embodiment of the tandem-type electrophotograph color printer of the present invention. In FIG. 19, the same elements as those of FIG. 8 will be referred to by the same numerals, and a description thereof will be omitted.

The optical unit changes directions of the four light beams having an intensity thereof modulated, thereby scanning the beams in a main scan direction (indicated by an arrow M2).

The optical unit includes a semiconductor laser source 336, a polygon mirror 227, a fθ lens 328, a reflection mirror 329, and a BD sensor 331.

Beams emitted from the semiconductor laser source 336 are directed to the polygon mirror 227. The polygon mirror 227 is rotated by the motor 234 in a direction shown by an arrow C to deflect the beam in accordance with the rotation angle, thereby scanning the beams in a direction M2.

The beams reflected by the polygon mirror 227 are further reflected by the reflection mirror 329 to hit the BD sensor 331 and to sweep over the photosensitive drums 209. The BD sensor 331 detects the light, and informs an optical-control circuit 301, which will be described later. The beam detection by the BD sensor 331 controls timings to draw latent images.

Figure 20:
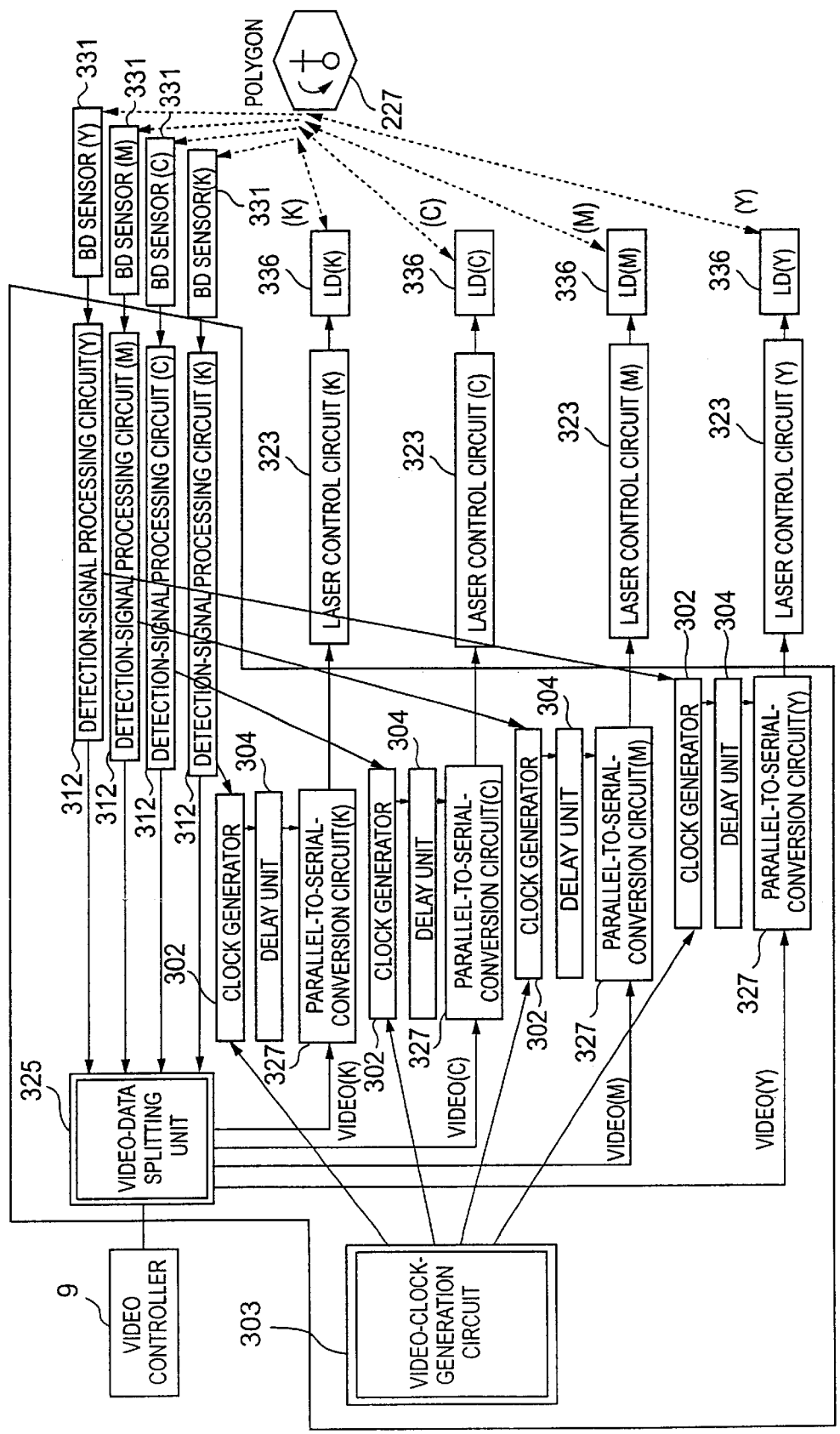
FIG. 20 is a block diagram of a signal processing system used in the configuration of FIG. 19.

FIG. 20 is a block diagram of a signal processing system used in the configuration of FIG. 19.

In FIG. 20, the same elements as those of FIG. 10 will be referred to by the same numeral. A video-data splitting unit 325 corresponds to the video-data splitting circuit 25 of FIG. 10, and parallel-to-serial-conversion circuits 327 are equated to the parallel-to-serial-conversion circuits 26 and 27 of FIG. 10. Further, delay units 304 have the delay units 32 and 33 as their counterparts in FIG. 10, and clock generators 302 correspond to the clock generators 104 and 105 of FIG. 10. Detection-signal processing circuits 312 and a video-clock-generation circuit 303 correspond to the detection-signal processing circuit 102 and the video-clock-generation circuit 103 of FIG. 10, respectively. Moreover, laser control circuits 323 have their counterparts, the laser control circuits 22 and 23, in FIG. 10, and LDs 336 are equated to the laser diodes 235 and 236 of FIG. 10. BD sensors 331 correspond to the optical sensor 231 of FIG. 10.

An optical-control circuit 301 of this embodiment includes the video-data splitting unit 325 and the video-clock-generation circuit 303, and further includes, for respective colors (yellow, magenta, cyan, and black), the parallel-to-serial-conversion circuits 327, the detection-signal processing circuits 312, the clock generators 302, and the delay units 304.

The video-data splitting unit 325 receives video data from the video controller 9, and splits the data so as to supply the video data via respective lines to the parallel-to-serial-conversion circuits 327 of the respective colors.

The parallel-to-serial-conversion circuits 327 corresponding to the respective colors convert the video data from parallel to serial as it is supplied from the video-data splitting unit 325 where the conversion is carried out in synchronization with a clock signal supplied from the clock generators 302. The serial data obtained by the parallel-to-serial-conversion circuits 327 are supplied to the laser control circuits 323. Based on the supplied serial video data, the laser control circuits 323 drive the semiconductor lasers 336.

The detection-signal processing circuits 312 provided for the respective colors receive detection signals from the respective BD sensors 331, and supply the detection signals of the respective colors to the delay units 304 and the laser control circuits 323.

The clock generators 302 receive video clocks from the video-clock-generation circuit 303. The clock generators 302 synchronize the video clocks generated by the video-clock-generation circuit 303 with the detection signals detected by the BD sensors 331, and output the synchronized video clocks.

The video clocks output by the respective clock generators 302 in synchronization with the detection signals of the BD sensors 331 are supplied to the delay units 304. In the delay units, the video clocks are delayed by a predetermined delay time corresponding to a time length that passes from the detection by the BD sensors 331 to the start of information recording, and are supplied to the parallel-to-serial-conversion circuits 327.

In such a device as this, latent images formed on the photo-sensitive drums of the respective colors are developed by using toners of respective colors, and the toner images are superimposed one over another on a print sheet, thereby generating a color image for color printing. To this end, each toner image needs to be positioned accurately for the superimposition, and needs to have the same size. For this purpose, each optical unit adjusts the light intensity and the timings to draw images when generating the latent image on the photo-sensitive drum 209.

The clock generators 302 for yellow, magenta, cyan, and black receive the video clocks from the video-clock-generation circuit 303, and also receive the detection signals from the detection-signal processing circuits 312 as trigger signals.

The clock generators 302 synchronize the video clocks supplied from the video-clock-generation circuit 303 with the detection signals of the detection-signal processing circuits 312, and output the synchronized video signals.

The synchronized video signals output from the clock generators 302 are delayed by a predetermined delay time in the delay units 304, and, then, are supplied to the parallel-to-serial-conversion circuits 327. The parallel-to-serial-conversion circuits 327 convert the video data from parallel to serial in synchronization with the supplied video clocks, and supply the serial video data to the laser control circuits 323.

The laser control circuits 323 have basically the same configuration as that of the laser control circuits 22 and 23 shown in FIG. 15.

Accordingly, in the same manner as in the configuration of FIG. 15, each of the laser control circuits 323 amplifies the video data supplied from the corresponding one of the parallel-to-serial-conversion circuits 327, and applies a driving voltage responsive to the video data to a driver transistor so as to control the driving current of the semiconductor laser (LD) 336. In accordance with the adjustment of the driving current, the semiconductor laser (LD) 336 emits a laser beam having an adjusted intensity at an adjusted timing.

Further, the present invention is not limited to these embodiments, but various variations and modifications may be made without departing from the scope of the present invention.

The contents of this specification is based on Japanese Patent application No. 2000-160993 filed on May 30, 2000, with the Japanese Patent Office, the entire contents of which are hereby incorporated by reference.

What is claimed is:

1. A circuit for controlling scanning of light, comprising:
   a detection-signal processing unit which generates a detection signal indicative of a timing at which a light beam hits a predetermined reference position, said detection-signal processing unit including a comparator which receives a sensor signal indicating a sensor detection of the light beam at the reference position, and compares the sensor signal with a reference voltage level so as to output the detection signal according to a result of the comparison;
   a clock-generation unit which generates a clock signal in synchronism with the detection signal such that a timing of the clock signal is adjustable by the detection signal independently of a length of one clock cycle of the clock signal, wherein the clock signal synchronizes the light beam; and
   an intensity setting unit which adjusts an intensity of the light beam to perform a fine relative-timing adjustment of a timing of the detection signal relative to a timing of the sensor signal.

2. The circuit as claimed in claim 1, wherein said clock-generation unit is a clock generator.

3. The circuit as claimed in claim 1, further comprising a light-beam generating unit which generates a plurality of light beams, and a plurality of said clock-generation units identical to said clock-generation unit, wherein said plurality of clock-generation unit generate clock signals for synchronizing said plurality of light beams.

4. An optical unit for controlling scanning of light, comprising:
   a light-beam generating unit which generates a light beam;
   a light-beam scanning unit which scans the light beam;
   a detection-signal precessing unit which generates a detection signal indicative of a timing at which the light beam hits a predetermined reference position, said detection-signal processing unit including a comparator which receives a sensor signal indicating a sensor detection of the light beam at the reference position, and compares the sensor signal with a reference voltage level so as to output the detection signal according to a result of the comparison;
   a clock-generation unit which generates a clock signal in synchronism with the detection signal such that a timing of the clock signal is adjustable by the detection signal independently of a length of one clock cycle of the clock signal, wherein the clock signal synchronizes the light beam; and
   an intensity setting unit which adjusts an intensity of the light beam to perform a fine relative-timing adjustment of a timing of the detection signal relative to a timing of the sensor signal.

5. The optical unit as claimed in claim 4, wherein said clock-generation unit is a clock generator.

6. The optical unit as claimed in claim 4, further comprising:
   one or more light-beam generating units which generate respective light beams; and
   one or more clock-generation units identical to said clock-generation unit, wherein said one or more clock-generation units generate clock signals for synchronizing the respective light beams.

7. An image forming device for forming an image on a sheet of paper by controlling scanning of light, comprising:
   a light-beam generating unit which generates a light beam;
   a light-beam scanning unit which scans the light beam;
   a detection-signal processing unit which generates a detection signal indicative of a timing at which the light beam hits a predetermined reference position, said detection-signal processing unit including a comparator which receives a sensor signal indicating a sensor detection of the light beam at the reference position, and compares the sensor signal with a reference voltage level so as to output the detection signal according to a result of the comparison;
   a clock-generation unit which generates a clock signal in synchronism with the detection signal such that a timing of the clock signal is adjustable by the detection signal independently of a length of one clock cycle of the clock signal, wherein the clock signal synchronizes the light beam; and an intensity setting unit which adjusts an intensity of the light beam to perform a fine relative-timing adjustment of a timing of the detection signal relative to a timing of the sensor signal.

8. The image forming device as claimed in claim 7, wherein said clock-generation unit is a clock generator.

9. The image forming device as claimed in claim 7, further comprising:

one or more light-beam generating units which generate respective light beams; and one or more clock-generation units identical to said clock-generation unit, wherein said one or more clock-generation units generate clock signals for synchronizing the respective light beams.

\* \* \* \* \*